(12) United States Patent
Zaitseva et al.

(10) Patent No.: US 12,060,507 B2
(45) Date of Patent: Aug. 13, 2024

(54) COMPOUNDS AND COMPOSITION FOR PREPARATION OF LITHIUM-LOADED PLASTIC SCINTILLATORS

(71) Applicant: Lawrence Livermore National Security, LLC, Livermore, CA (US)

(72) Inventors: Natalia P. Zaitseva, Livermore, CA (US); M Leslie Carman, San Ramon, CA (US); Andrew M. Glenn, Livermore, CA (US); Andrew Neil Mabe, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 577 days.

(21) Appl. No.: 17/225,429

(22) Filed: Apr. 8, 2021

(65) Prior Publication Data
US 2021/0317364 A1    Oct. 14, 2021

Related U.S. Application Data

(60) Provisional application No. 63/007,235, filed on Apr. 8, 2020.

(51) Int. Cl.
| | |
|---|---|
| *C09K 11/06* | (2006.01) |
| *C09B 69/10* | (2006.01) |
| *G01T 1/20* | (2006.01) |
| *G01T 1/203* | (2006.01) |
| *G01T 3/06* | (2006.01) |

(52) U.S. Cl.
CPC ............ *C09K 11/06* (2013.01); *C09B 69/109* (2013.01); *G01T 1/2006* (2013.01); *G01T 1/2033* (2013.01); *G01T 3/06* (2013.01); *C09K 2211/1088* (2013.01)

(58) Field of Classification Search
CPC ... C09K 11/08; C09K 2211/1088; G01T 3/06; G01T 1/2006; G01T 1/2033
See application file for complete search history.

(56) References Cited

U.S. PATENT DOCUMENTS

| | | |
|---|---|---|
| 5,606,638 A | 2/1997 | Tymianski et al. |
| 9,234,968 B1 * | 1/2016 | Cherepy .................. G01T 3/06 |
| | (Continued) | |

FOREIGN PATENT DOCUMENTS

| | | | |
|---|---|---|---|
| EP | 3591025 | * | 1/2020 |
| EP | 3591025 A1 | | 1/2020 |
| WO | 9915912 A1 | | 4/1999 |

OTHER PUBLICATIONS

Cherepy et al, "Bismuth- and lithium-laoded plastic scintillators for gamma and neutron detection", Nuclear Instuments and Methods in Physics Reserach A, 778(2015), pp. 126-132, Jan. 9, 2015.*

(Continued)

*Primary Examiner* — C Melissa Koslow
(74) *Attorney, Agent, or Firm* — Zilka-Kotab, P.C.

(57) ABSTRACT

A scintillator material includes a polymer matrix, a primary dye in the polymer matrix, the primary dye being a fluorescent dye; a secondary dye, and a Li-containing compound in the polymer matrix, where the Li-containing compound is a Li salt of a short-chain aliphatic acid. In addition, the scintillator material exhibits an optical response signature for thermal neutrons that is different than an optical response signature for fast neutrons.

20 Claims, 13 Drawing Sheets

(56) References Cited

U.S. PATENT DOCUMENTS

| | | | |
|---|---|---|---|
| 9,274,237 | B2 | 3/2016 | Zaitseva et al. |
| 9,650,564 | B2 | 5/2017 | Zaitseva et al. |
| 2014/0224993 | A1 | 8/2014 | Noh et al. |
| 2015/0028217 | A1 | 1/2015 | Zaitseva et al. |
| 2015/0123036 | A1 | 5/2015 | Walker et al. |
| 2016/0177176 | A1* | 6/2016 | Winter .................... G01T 1/20 250/483.1 |

OTHER PUBLICATIONS

Breukers et al, "Transparent lithium loaded plastic scintillators for thermal neutron decteion", Nuclear Instruments and Methods in Physics Research A, 701 (2013), pp. 58-61, Nov. 1, 2012.*

Zaitseva et al., "Recent developments in plastic scintillators with pulse shape discrimination," Nuclear Inst. and Methods in Physics Research, A, vol. 889, 2018, pp. 97-104.

Zaitseva et al., "Plastic scintillators with efficient neutron/gamma pulse shape discrimination," Nuclear Instruments and Methods in Physics Research A, vol. 668, 2012, pp. 88-93.

Cherepy et al., "Bismuth- and lithium-loaded plastic scintillators for gamma and neutron detection," Nuclear Instruments and Methods in Physics Research A, vol. 778, 2015, pp. 126-132.

Mabe et al., "Transparent plastic scintillators for neutron detection based on lithium salicylate," Nuclear Instruments and Methods in Physics Research A, vol. 806, 2016, pp. 80-86.

Zaitseva et al., "Pulse shape discrimination with lithium-containing organic scintillators," Nuclear Instruments and Methods in Physics Research A, vol. 729, 2013, pp. 747-754.

Luxottica Exciton, "Exalite 404," Luxottica Exciton, 1 page, retrieved from https://www.photonicsolutions.co.uk/upfiles/Exalite%20404.pdf, on Feb. 18, 2021.

Luxottica Exciton, "Exalite 411," Luxottica Exciton, 1 page, retrieved from https://www.photonicsolutions.co.uk/upfiles/Exalite%20411.pdf, on Feb. 18, 2021.

Luxottica Exciton, "Exalite 411," Luxottica Exciton, 1 page, retrieved from https://www.photonicsolutions.co.uk/upfiles/Exalite%20417.pdf, on Feb. 18, 2021.

Dexter, D.L., "A Theory of Sensitized Luminescence in Solids," The Journal of Chemical Physics, vol. 21, No. 5, May 1953, pp. 836-850.

Blum et al., "Ab initio molecular simulations with numeric atom-centered orbitals," Computer Physics Communications, 2009, 23 pages.

Reineke et al., "Room temperature triplet state spectroscopy of organic semiconductors," Scientific reports, Jan. 21, 2014, pp. 1-8.

Luxottica Exciton, "Exalite 417," Luxottica Exciton, 1 page, retrieved from https://www.photonicsolutions.co.uk/upfiles/Exalite%20417.pdf, on Feb. 18, 2021.

International Search Report and Written Opinion from PCT Application No. PCT/US2021/026418, dated Jul. 28, 2021.

Munish Rana, "A Study on the Role of Dye Lasers," Globus an International Journal of Management & It, a Refereed Research Journal, vol. 6, No. 1, Jul.-Dec. 2014, pp. 80-82.

Bruekers et al., "Transparent lithium loaded plastic scintillators for thermal neutron detection," Nuclear Instruments and Methods in Physics Research A, vol. 701, 2013, pp. 58-61.

Office Action from Canadian Application No. 3,170,751, dated Nov. 10, 2023, 8 pages.

Winter et al., "A fast microchannel plate-scintillator detector for velocity map imaging and imaging mass spectrometry," Review of Scientific Instruments, vol. 85, 2014, 10 pages.

Extended European Search Report from European Application No. 21785326.6, dated Apr. 10, 2024, 6 pages.

* cited by examiner

COMPOUNDS AND COMPOSITION FOR PREPARATION OF LITHIUM-LOADED PLASTIC SCINTILLATORS

RELATED APPLICATION

This application claims priority to Provisional U.S. Appl. No. 63/007,235 filed on Apr. 8, 2020, which is herein incorporated by reference.

This invention was made with Government support under Contract No. DE-AC52-07NA27344 awarded by the United States Department of Energy. The Government has certain rights in the invention.

FIELD OF THE INVENTION

The present invention relates to radiation detection, and more particularly to Li-loaded plastic scintillators including non-traditional dye systems that enable capabilities for simultaneous detection of fast and thermal neutrons, and methods of making and using the same.

BACKGROUND

Radioactive materials are often detected and identified by measuring gamma-rays and/or neutrons emitted from the materials. The energy of gamma-rays is specific to that particular material and acts as a "fingerprint" to identify the material. Similarly, neutron energy is particular to the material, and may be used to identify the material. Of very high value are detectors capable of identifying the distinctive time-correlated signatures corresponding to neutrons and gamma rays emitted by fissioning materials from within a natural radiation background. A detector capable of distinguishing neutrons from gammas, as well as offering a fast response time typically has better capability for detecting the distinctive time-correlated events indicative of the presence of fissioning nuclei.

The ability to detect gamma rays and/or neutrons is a vital tool for many areas of research. For example, gamma-ray/neutron detectors allow scientists to study celestial phenomena and diagnose medical diseases. Accurate detection of neutrons is required in many areas. Neutron detectors are important tools for homeland security, helping the nation confront new security challenges. The nuclear non-proliferation mission requires detectors capable of identifying diversion or smuggling of nuclear materials. Government agencies need detectors for scenarios in which a terrorist might use radioactive materials to fashion a destructive device targeted against civilians, structures, or national events. To better detect and prevent nuclear incidents, the Department of Energy (DOE) and the Department of Homeland Security (DHS) are funding projects to develop a suite of detection systems that can search for radioactive sources in different environments.

According to their energy, neutrons are typically divided in two major groups: thermal (low-energy) neutrons and fast (high-energy) neutrons. Until the recent years, the preferred way for thermal neutron detection was use of $^3$He tubes, while detection of fast neutrons was made with liquid scintillators. Invention of plastic scintillators with pulse shape discrimination (PSD) became a breakthrough that, for the first time, enabled use of plastics in direct neutron detection. Among currently commercially produced plastic scintillators, only EJ-276 can be used for detection of exclusively fast neutrons via neutron/gamma PSD. This plastic utilizes a composition comprised mainly of aromatic polymers, like polyvinyltoluene (PVT) or polystyrene (PS) loaded with the high concentration (~30%) of one primary dye combined with a small addition (~2%) of a secondary dye (wave shifter) that facilitates the enhancement of the light output (LO).

Furthermore, pulse shape discrimination (PSD) provides means for high-energy neutron detection in the presence of gamma radiation background by utilizing the difference in the shapes of scintillation pulses excited by neutrons (recoil protons) and gamma (γ)-rays in organic scintillators. PSD phenomena are based on the existence of two-decay component fluorescence, in which, in addition to the main component decaying exponentially (prompt fluorescence), there is usually a slower emission that has the same wavelength, but longer decay time (delayed emission). According to a commonly accepted mechanism shown in FIG. 1, the fast component results from the direct radiative de-excitation of excited singlet states ($S_1$), while the slow component originates from the interaction of pairs of excited molecules (or excitons) in the lowest excited π-triplet states ($T_1$).

Since the triplet is known to be mobile in some compounds, the energy migrates until the two triplets collide and experience a process, shown as Equation 1:

$$T_1 + T_1 \rightarrow S_0 + S_1 \qquad \text{Equation 1}$$

In Equation 1, $T_1$ is a triplet, $S_0$ is the ground state, and $S_1$ is a first excited state. Finally, the delayed singlet emission occurs with a decay rate characteristic of the migration rate and concentration of the triplet population, and is represented by Equation 2:

$$S_1 \rightarrow S_0 + h\nu \qquad \text{Equation 2}$$

In Equation 2, hv is fluorescence, while $S_0$ is the ground state and $S_1$ is a first excited singlet state. The short range of the energetic protons produced from neutron collisions with hydrogen atoms illustrated by FIG. 1 yields a high concentration of triplets, compared to the longer range of the electrons from the gamma interactions, leading to the enhanced level of delayed emission with longer decay times in neutron-induced pulses in comparison to those produced by the gamma excitation. The observation of PSD in organics with phenyl groups is believed to be, in part, related to the aromatic ring structure, allowing for the migration of triplet energy.

FIG. 2A shows a plot of average waveforms for a stilbene test crystal indicating different levels of delayed light in neutron and gamma scintillation pulses. As seen from the plot, some light is produced by the crystal almost immediately, referred to as prompt light, and other light is produced by the crystal over a period of time, referred to as delayed light. Generally, the plot for each type of radiation will have a steep component 202 and a tail component 204. The upper line in the plot represents neutron light decay, while the lower line represents gamma (γ) light decay. As shown in FIG. 2A, the shape for the neutron response has a large tail component 204, which is much smaller or almost negligible for gammas. Thus, stilbene is able to differentiate between the neutron and gamma light decays and produces noticeably different lines for each radiation type. However, not every compound has this ability to separate between gamma and neutron light decay; therefore, compounds with such ability are very useful for PSD.

Modern high-speed waveform digitizers allow for easy separation of neutron and gamma pulses, enabling rapid characterization of PSD properties, as shown in FIG. 2B. The waveforms may be numerically integrated over two time intervals: $\Delta_{Total}$ and a subinterval $\Delta_{Tail}$ (e.g., for >50 nsec), corresponding to the total charge and the delayed component of the signal, respectively. The value of the ratio of charge $R=Q_{Tail}/Q_{Total}$ for the two time intervals indicates whether the considered event was likely produced by a neutron (high R value) or a gamma ray (small R value). The plot shown in FIG. 2B reveals the presence of both neutrons (upper scatter points) and gammas (lower scatter points) in a plot of the ratio of charge ($Q_{Tail}/Q_{Total}$) versus the pulse height.

FIG. 2C illustrates one approach where the neutron/gamma delayed light separation, S, in the stilbene test crystal is used for calculation of the PSD figure of merit (FoM). The PSD separation, S, refers to the gap between the mean ratio of charge ($Q_{Tail}/Q_{Total}$) for gamma rays and the mean ratio of charge ($Q_{Tail}/Q_{Total}$) for neutrons taken over an extended period of time. The larger the separation, S, the better the organic crystal is at PSD for distinguishing gammas and neutrons.

The PSD technique is most frequently utilized for discrimination between fast neutrons (recoil protons) and gamma-rays (Compton electrons) using liquid scintillators and a few organic crystals. Recent developments broadened the group of PSD materials to include scintillating plastics. However, because PSD in current scintillators is based mainly on the interaction of fast neutrons with hydrogen of aromatic groups, traditional PSD materials can be used only for detection of fast neutrons, leaving undetected the large fraction of low-energy and thermal neutrons that do not generate enough light in elastic scatter interaction.

Recent studies have shown that PSD plastics can be also successfully used for detection of thermal neutrons if certain thermal capture elements, like $^6$Li, are added to the composition of plastics. Some techniques for detection of thermal neutrons have been typically based on $^3$He detectors. However, due to the imminent shortage of $^3$He, other neutron detection technologies utilizing $^{10}$B and $^6$Li loaded scintillating materials have been considered as possible replacements for $^3$He detectors. The main advantages of $^6$Li use in scintillators is the high efficiency for thermal neutron detection and absence of gamma-rays in the capture products. Detection of thermal neutrons using Li-containing compounds is based on a known capture reaction, Equation 3:

Equation 3

As illustrated in FIGS. 3A and 3B, incorporation of $^6$Li into the plastic composition leads to additional signature of the monoenergetic α-particles produced as a results of thermal neutron interaction with $^6$Li atoms. FIG. 3A illustrates a typical PSD distribution measured with a PSD plastic without $^6$Li showing separated signatures of fast neutrons and gamma rays. FIG. 3B illustrates $^6$Li-loaded plastic producing "triple PSD" signatures of thermal neutrons, fast neutrons, and gamma rays. Thus, the "triple PSD" signature of $^6$Li-loaded plastic scintillators allows detection of both fast and thermal neutrons in one detection unit, without heavy moderation used in other thermal neutron detectors. This process provides a stark contrast from the current state-of-the-art that requires use of two different detectors for fast and thermal neutrons.

Recently, $^6$Li-loaded scintillators are highly desirable for many radiation detection applications. However, despite these advantages, materials currently utilizing the detection properties of $^6$Li are only a few single crystals, such as LiI, LiF, CLYC, are available at relatively small sizes and high cost that is not acceptable for many applications.

$^6$Li-loaded plastics are an excellent inexpensive alternative to crystals; however, a main challenge in preparation of $^6$Li-loaded plastics relates to the difficulties in incorporation of highly-polar Li-compounds in non-polar aromatic polymer matrices used for regular plastic preparation. Recent studies have shown unique "triple PSD" properties of materials capable of simultaneous detection of fast and thermal neutrons in one detection unit. However, despite the substantial interest from the user communities, commercial production of plastics has been problematic due to (1) difficult synthesis and purification procedures of the previously proposed $^6$Li compounds, (2) difficulties in plastic preparation, and (3) insufficient light output (LO) caused by high self-absorption of the plastic composition components.

For PSD plastics, an additional challenge was introduced by the requirement of the high primary dye solubility that limits the choice of primary dyes that can be used in combination with suitable $^6$Li additions. Moreover, PSD plastics degrade over time; thus, a PSD plastic that retains its fluorescent capability over time would be desirable.

SUMMARY

In one inventive aspect, a scintillator material includes a polymer matrix, a primary dye in the polymer matrix, the primary dye being a fluorescent dye; a secondary dye, and a Li-containing compound in the polymer matrix, where the Li-containing compound is a Li salt of a short-chain aliphatic acid. In addition, the scintillator material exhibits an optical response signature for thermal neutrons that is different than an optical response signature for fast neutrons.

In another inventive aspect, a method for fabricating a scintillator material includes heating a precursor mixture until a polymerization process is complete. The precursor mixture includes a polymer matrix precursor present in an amount ranging from about 60 wt. % to about 95 wt. %, a primary fluor present in an amount ranging from about 5 wt. % to about 40 wt. %, where the primary fluor is soluble in the polymer matrix precursor, a secondary fluor present in an amount ranging from about 0.2 wt. % to about 6 wt. %, an initiator, a Li-containing compound where the Li-containing compound is a salt of an aliphatic acid having no more than 6 carbons per molecule thereof, and a coordinating solvent.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
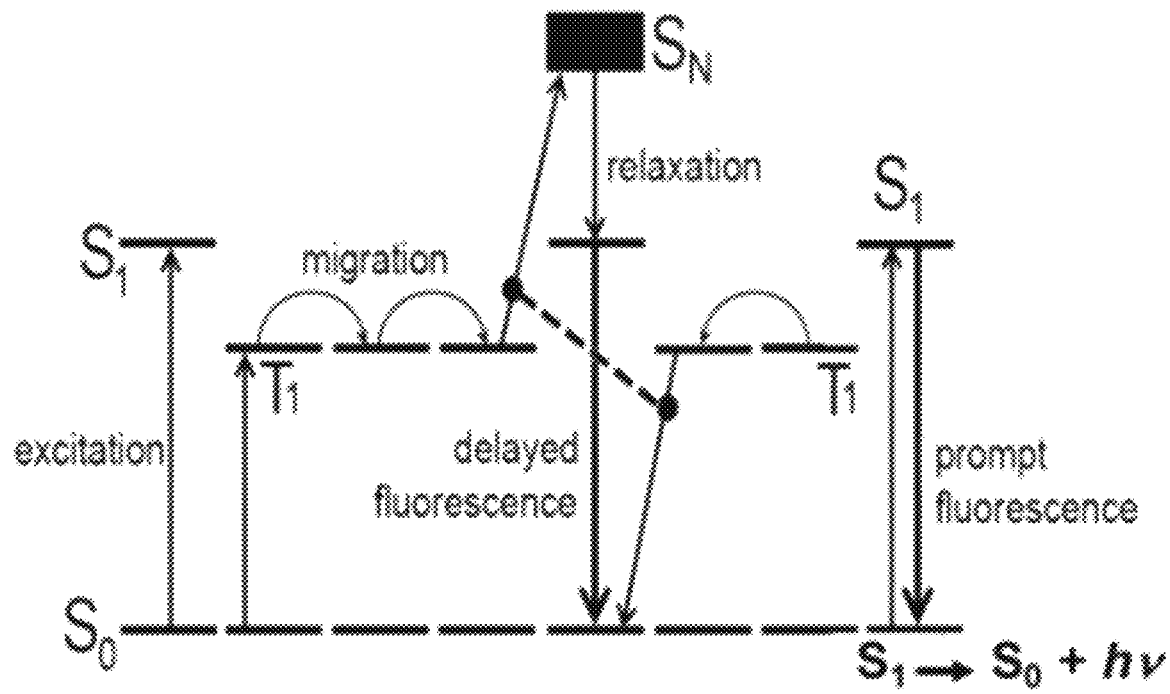
FIG. 1 shows a mechanism for delayed photoluminescence according to the prior art.
Figure 1:
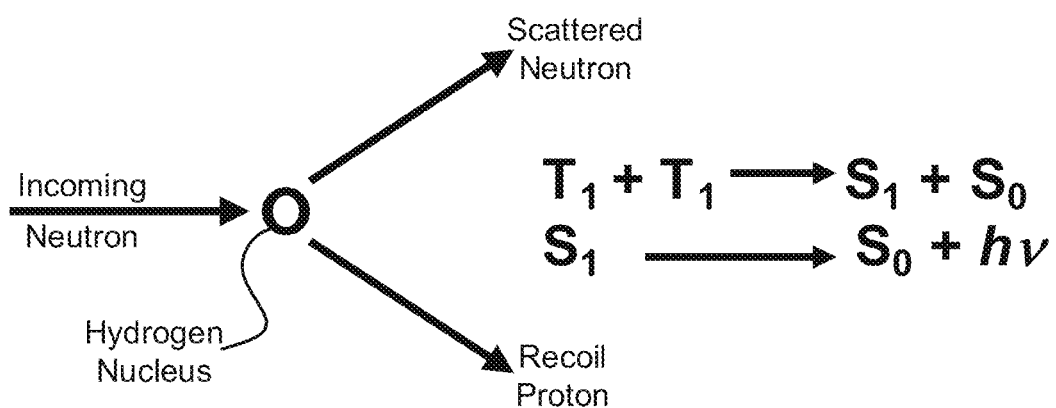
Figure 2A:
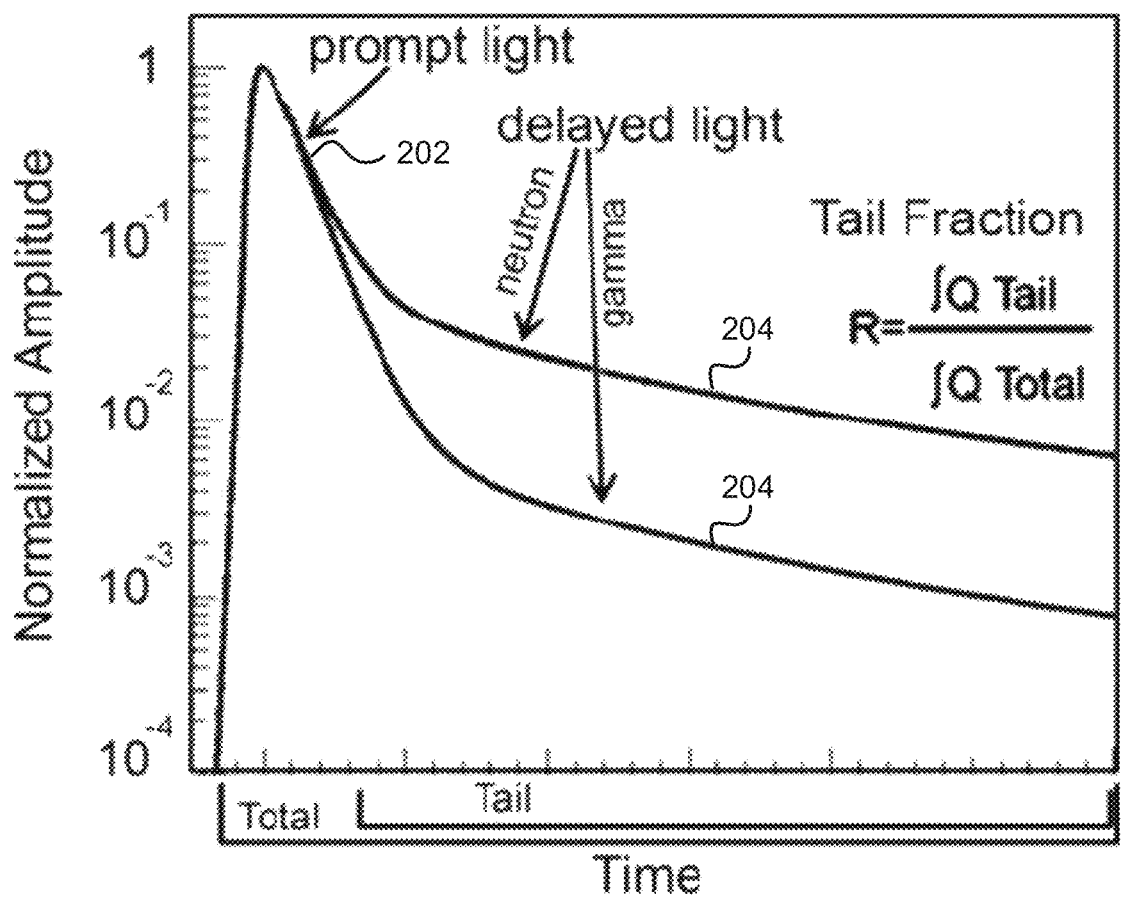
FIG. 2A shows a plot of average waveforms for stilbene indicating different levels of delayed light in neutron and gamma scintillation pulses according to one inventive aspect.
Figure 2B:
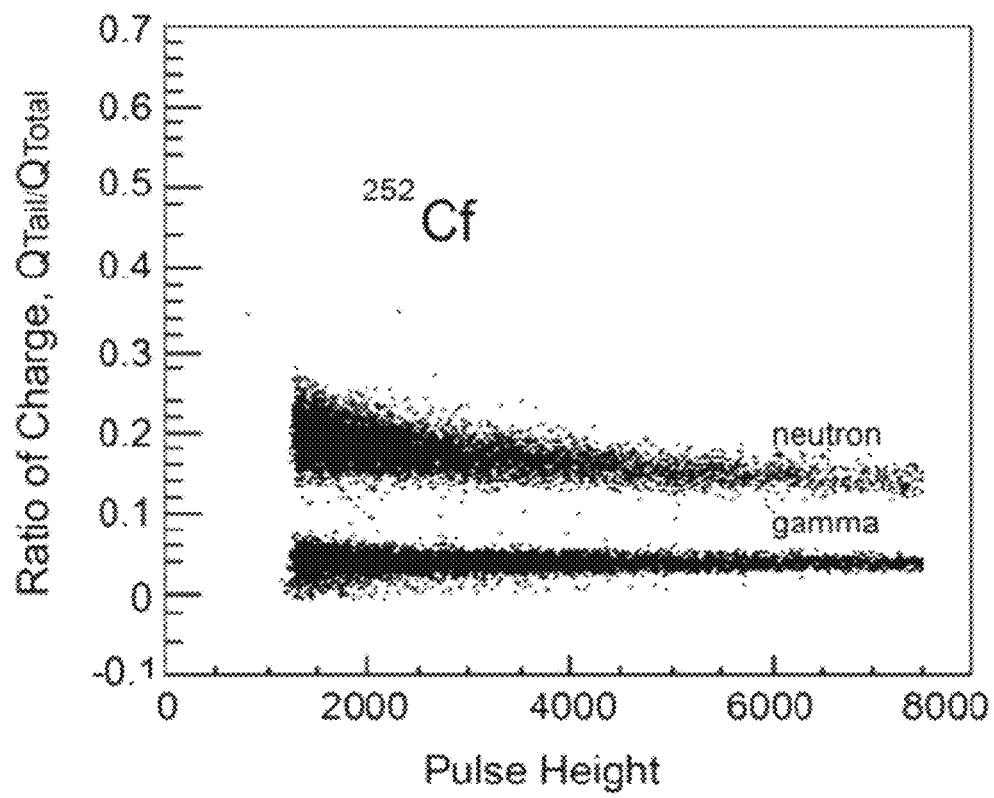
FIG. 2B shows a PSD pattern of a stilbene crystal obtained by digitized separation of neutron and gamma pulses according to one inventive aspect.
Figure 2C:
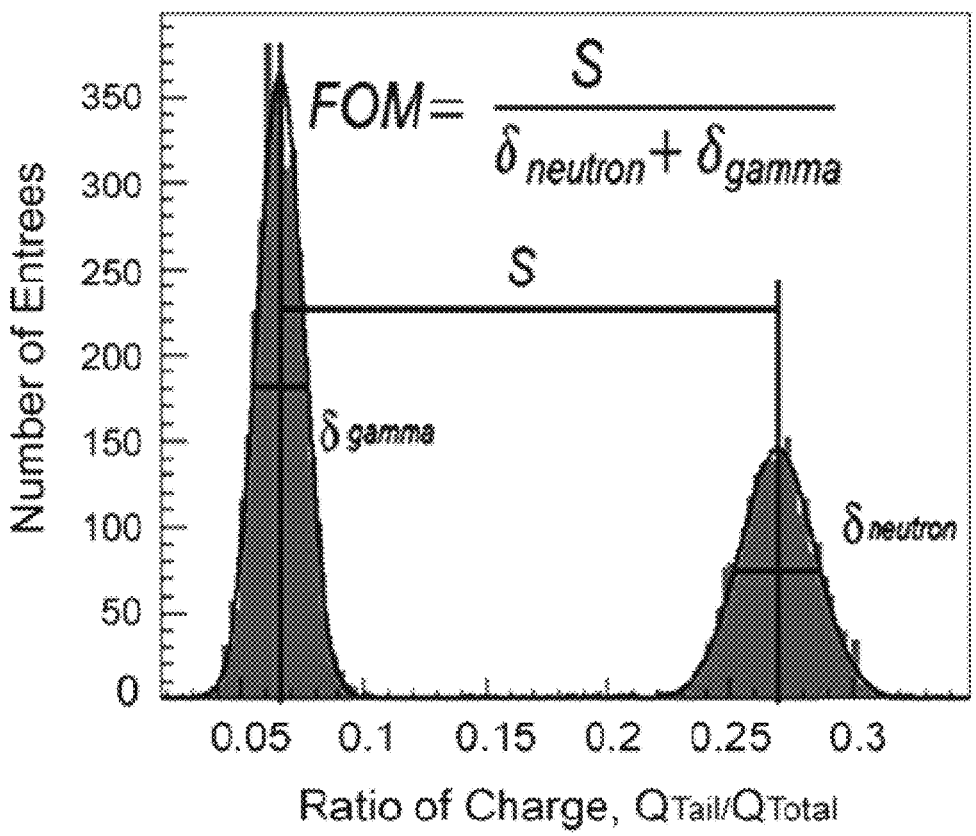
FIG. 2C shows PSD profiles of stilbene used for calculation of the PSD figure of merit (FoM) according to one inventive aspect.
Figures 3A, 3B:
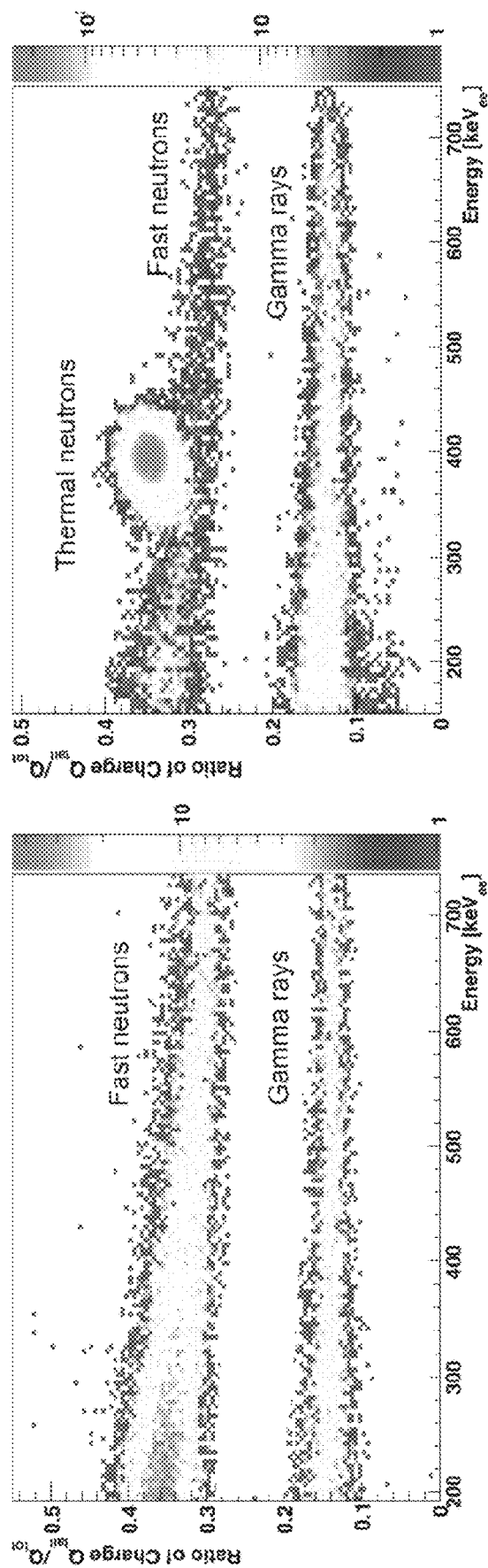
FIG. 3A shows a typical PSD profile of PSD plastic without $^6$Li, according to one inventive aspect.
FIG. 3B shows a typical PSD profile of a $^6$Li-loaded plastic, according to one inventive aspect.

The following description is made for the purpose of illustrating the general principles of the present invention and is not meant to limit the inventive aspects claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein, all percentage values are to be understood as percentage by weight (wt. %), unless otherwise noted. Moreover, all percentages by weight are to be understood as disclosed in an amount relative to the bulk weight of an organic plastic scintillator material or a liquid scintillator material, in various approaches.

Unless expressly defined otherwise herein, each component listed in a particular approach may be present in an effective amount. An effective amount of a component means that enough of the component is present to result in a discernable change in a target characteristic of the ink, mixture, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

As also used herein, the term "about" when combined with a value refers to plus and minus 10% of the reference value. For example, a length of about 10 nm refers to a length of 10 nm±1 nm, a temperature of about 50° C. refers to a temperature of 50° C.±5° C., etc.

As additionally used herein, a material that is "optical transparent" refers to a material that is substantially free (e.g., >99% free, preferably >99.5% free) of grain boundaries or light scatter defects, such that the material is homogenous (e.g., comprises one-phase). Moreover, optically transparent materials are those through which light propagates uniformly and are capable of transmitting at least 90% of incident light.

The description herein is presented to enable any person skilled in the art to make and use the invention and is provided in the context of particular applications of the invention and their requirements. Various modifications to the disclosed inventive aspects will be readily apparent to those skilled in the art upon reading the present disclosure, including combining features from various approaches to create additional and/or alternative approaches thereof.

Moreover, the general principles defined herein may be applied to other inventive aspects and applications without departing from the spirit and scope of the present invention. Thus, the present invention is not intended to be limited to the approaches shown but is to be accorded the widest scope consistent with the principles and features disclosed herein.

The following description discloses several preferred inventive aspects of compounds and composition of lithium loaded plastic scintillators and/or related systems and methods.

In one general inventive aspect, a scintillator material includes a polymer matrix, a primary dye in the polymer matrix, the primary dye being a fluorescent dye; a secondary dye, and a Li-containing compound in the polymer matrix, where the Li-containing compound is a Li salt of a short-chain aliphatic acid. In addition, the scintillator material exhibits an optical response signature for thermal neutrons that is different than an optical response signature for fast neutrons.

In another general inventive aspect, a method for fabricating a scintillator material includes heating a precursor mixture until a polymerization process is complete. The precursor mixture includes a polymer matrix precursor present in an amount ranging from about 60 wt. % to about 95 wt. %, a primary fluor present in an amount ranging from about 5 wt. % to about 40 wt. %, where the primary fluor is soluble in the polymer matrix precursor, a secondary fluor present in an amount ranging from about 0.2 wt. % to about 6 wt. %, an initiator, a Li-containing compound where the Li-containing compound is a salt of an aliphatic acid having no more than 6 carbons per molecule thereof, and a coordinating solvent.

A list of acronyms used in the description is provided below.

ASIC Application specific integrated circuit
Bis-MSB 1,4-bis(2-methylstyryl)benzene
BP biphenyl, biphenyl derivatives
C Celsius
C460 Coumarin 460
CLYC Cesium Lithium Yttrium Chloride
DME 1,2-dimethoxyethane
DPA diphenyl anthracene
FoM Figure of merit
$^3$He Helium-3
$^6$Li Lithium-6
LiF Lithium Fluoride
LiI Lithium Iodide
LO Light output
m meter
MeV Mega electron-volt
m-TP m-terphenyl
nsec nanosecond
PL photoluminescence
PMAA polymethacrylic acid
PMMA polymethylmethacrylate
POPOP 1,4-Bis(5-phenyl-2-oxazolyl)benzene
PPO 2,5-diphenyloxazole
PS polystyrene
PSD Pulse Shape Discrimination
PVT polyvinyltoluene
PVX polyvinyl xylene
QY Quantum yield
$S_0$, $S_1$ Singlet states
SNM Special nuclear materials
$T_1$ First π-triplet state
THF tetrahydrofuran
TMQ tetramethyl-1,1': 4',1": 4"1"'-quaterphenyl
TT Triplet-Triplet interaction
TTA Triplet-Triplet Annihilation The following description includes several inventive aspects relating to the new compounds, the combination of which produces compositions suitable for easy preparation of $^6$Li-loaded plastic scintillators. The process involves components not used in plastic scintillator preparations before: (1) mixture of two or more primary dyes selected based on the compatibility of the excited triplet state levels for fast neutron detection and the enhancement of PSD; (2) use of $^6$Li-salts of short-chain aliphatic acids for the sensitivity to thermal neutrons; (3) new secondary dyes, called Exalites, found to increase the LO of $^6$Li-loaded plastics to the levels needed for practical application in working neutron detectors. The secondary dyes, e.g., Exalites, provide low self-absorption and high light output (LO) suitable for practical applications.

In some approaches, the proposed materials may be scaled to approximately 0.5 meter (m) dimensions and show high physical stability and adequate performance in prototypes of antineutrino detectors.

Moreover, various approaches of the present invention may be used for large-volume preparation of rigid, transparent plastics with scintillation properties for thermal neutron detection by both pulse-height and pulse shape discrimination measurement techniques. Furthermore, various approaches of the present invention describe the fabrication of Li-containing scintillator materials capable of simultaneous detection of thermal neutrons and fast neutrons discriminated from the gamma radiation background.

Robust neutron radiation detectors with a large sensitive area/volume, high detecting efficiency and a low cost means of making/using are important for the detection of neutrons in many areas such as nuclear nonproliferation, international safeguards, national security, scientific research, etc. In particular, for nuclear nonproliferation, fast and robust methods for the identification of special nuclear materials (SNM) are needed.

According to their energy, neutrons are typically divided in two major groups: thermal (low-energy) neutrons and fast (high-energy) neutrons. Detection of both types requires the separation of the neutron signatures from the always-present strong gamma radiation background. In common radiation detection practice, identification of both thermal and fast neutrons requires simultaneous use of two different types of detectors, one of which is based on mostly hydrocarbon-comprised scintillators (for fast neutron detection), and the other including scintillating materials loaded with thermal neutron capture reagents.

Conventional detection of thermal neutrons utilizes $^3$He detectors, the availability of which is sharply decreasing due to the diminishing supply of $^3$He obtained as a side product of tritium production. Accordingly, $^6$Li-loaded scintillating materials have been considered as possible replacements for $^3$He detectors.

$^6$Li possesses many desirable qualities as a neutron target. Among its important advantages are a reasonable capture cross section, relatively high photon yield from charged particles, and absence of gamma-rays in the final products resulting from a capture reaction $^6$Li+n$^o$=$^3$H+α+4.8 MeV. The majority of scintillators utilizing the thermal neutron detection properties of $^6$Li are inorganic single crystals or scintillation glasses. However, single crystal detectors are limited by the size of the crystals that can be grown and high costs associated with fabrication. Additionally, drawbacks of $^6$Li-loaded glass scintillators include long decay times and high sensitivity to gamma rays due to the presence of relatively heavy constituents in their compositions.

In some approaches, plastic scintillators offer a good alternative with wide field applications. Being comprised of low-Z materials, hydrocarbon-based plastics are less sensitive to gamma radiation. Additional advantages may be introduced in more approaches by the use of PSD formulations that enable separation of neutron signatures from gamma-radiation background. Moreover, plastics may be easily manufactured in different configurations and sizes and are inexpensive. Further, unlike the handling constraints and toxicity associated with liquid scintillators, plastic scintillators are non-hazardous and easy to handle, thus enabling their use in portal monitoring, environmental radiation protection, and in field conditions with broad range of temperatures, etc.

The principal drawback that prevents the use of $^6$Li-loaded plastic scintillators relates to the difficulties in their preparation due to the lack of solubility of highly polar Li-containing compounds in non-polar aromatic matrices needed for efficient scintillation. Thus, the majority of current $^6$Li-containing organic scintillators are typically prepared as non-PSD dispersions of nano- or micro-particles of different Li-compounds in liquid or plastic matrices that often have insufficient optical clarity and chemical instability due to inhomogeneous composition and structure.

Inventive aspects disclosed herein overcome the aforementioned drawbacks by providing Li-containing compounds that may be homogeneously dissolved in an organic scintillator material (e.g., a polymer matrix, a liquid, etc.) such that the scintillator material is substantially (e.g., >99%, preferably >99.5%) free of grain boundaries and light scatter defects (e.g., comprises a single phase, is homogenous, etc.) and is thus optically transparent. For example, it has been surprisingly found in some approaches that Li-salts of carboxylic acids with coordinating solvents may diminish the polarity of Li, thereby making the resulting Li-compound more soluble in non-polar aromatic matrices.

Following are several examples of general and specific approaches of Li-containing scintillators configured for thermal neutron, fast neutron and gamma detection, and/or related systems and methods.

General Scintillator-Based Radiation Detector System

Figure 4:
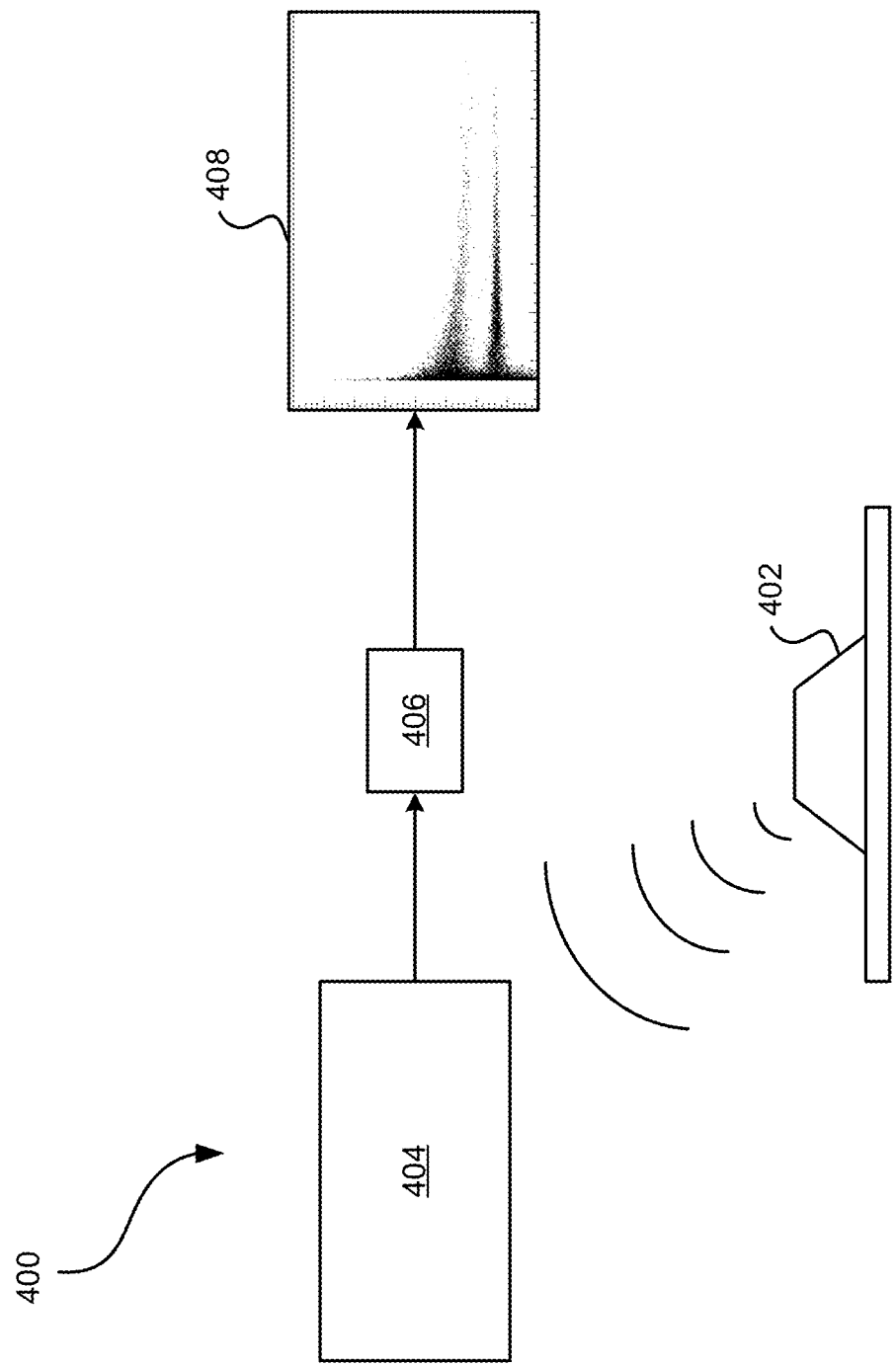
FIG. 4 shows a simplified layout of an instrument according to one inventive aspect.

FIG. 4 depicts a simplified spectroscopy system according to one inventive aspect. The system 400 comprises a scintillator material 402, such as of a type described herein, and which is referred to herein interchangeably as a scintillator. The system 400 also includes a photodetector 404, such as a photomultiplier tube or other device known in the art, which can detect light emitted from the scintillator 402, and detect the response of the material to at least one of neutron and gamma ray irradiation.

The scintillator 402 produces light pulses upon occurrence of an event, such as a neutron, a gamma ray, or other radiation engaging the scintillator 402. As the gamma ray, for example, traverses the scintillator 402, photons are released, appearing as light pulses emitted from the scintillator 402. The light pulses are detected by the photodetector 404 and transduced into electrical signals that correspond to the pulses. The type of radiation can then be determined by analyzing the integral of the light pulses and thereby identifying the gamma ray energy absorbed by the scintillator.

The system 400 includes a device 406 for processing pulse height output by the photodetector 404. The result of the processing may be displayed and/or stored on a display device 408 in any form, such as in a histogram or derivative thereof.

A Scintillator Material Having a Li-Salt of an Aliphatic Acid

According to one inventive aspect, a scintillator material includes a polymer matrix, a primary dye in the polymer matrix, a secondary dye, and a Li-containing compound in the polymer matrix, where the Li-containing compound includes a Li salt of a short-chain aliphatic acid. The scintillator material exhibits an optical response signature for thermal neutrons that is different than an optical response signature for fast neutrons. In some approaches, the scintillator material may detect an optical response signature for gamma rays.

Polymers

The organic, plastic scintillators as described in the approaches disclosed herein may include any suitable polymer matrix as the plastic component. In a preferred approach, the polymer matrix is a solid polymer matrix. Particularly suitable plastic scintillators are those that include rigid, durable, transparent plastics that possess aromatic or non-aromatic structures and are capable of supporting high concentrations of fluors (e.g., primary fluors, secondary fluors, tertiary fluors, etc.) therein. In some approaches, suitable plastic scintillators may be capable of supporting a total concentration of the fluors in a range from about 0.1 to about 95 wt. % fluor of the total scintillator. In preferred approaches, the plastic scintillator has a total concentration of the fluors in a range of about 3-75 wt. % fluor of the total scintillator.

In one approach, the polymer matrix may comprise polyvinyltoluene (PVT). Similar polymers may be utilized in other approaches, such as polystyrene (PS), polymethylmethacrylate (PMMA), polymethacrylic acid (PMAA) and its derivatives, polyvinyl xylene (PVX), polymethyl, 2,4-dimethyl, 2,4,5-trimethyl styrenes, polyvinyl diphenyl, other complex aromatic polymers, and certain non-aromatic polymers capable of solubilizing different scintillating high fluor concentrations, etc. as would be understood by one having ordinary skill in the art upon reading the present disclosure.

Suitable polymers, as used herein in preferred approaches, may be at least 50% light transmissive in a wavelength of interest, e.g., a wavelength emitted by one or more fluors present in the organic plastic scintillator system. In some approaches, suitable polymers may be preferably at least 95% light transmissive in a wavelength of interest.

In various approaches, the organic, plastic scintillator may comprise a colorless, optically transparent non-PSD plastic material for detection of thermal neutrons via pulse height measurements. In further approaches, the organic, plastic scintillator may comprise a colorless, optically transparent PSD plastic for simultaneous detection of thermal and fast neutrons discriminated from gamma radiation background via PSD measurement techniques.

In more approaches, the polymer may be provided as a liquid polymer matrix, a non-liquid polymer matrix, a dry powder, etc. as would be understood by one having ordinary skill in the art upon reading the present descriptions. Moreover, in some approaches the polymer matrix may include aromatic functional groups, such as phenyl groups, among others.

Li-Containing Compounds

The plastic scintillators disclosed herein include a Li-containing compound. In approaches including organic, plastic scintillator systems, suitable Li-containing compounds are those which may be homogenously dissolved in a polymer matrix (e.g., an aromatic polymer matrix, a non-aromatic polymer matrix, etc.), such that the scintillator material is substantially free (e.g., >99% free, preferably >99.5% free) of grain boundaries and scatter defects, comprises one phase, and is optically transparent, in some approaches. For the purposes of this disclosure, optically transparent is defined as a physical property of the scintillator material that allows light to pass through the material essentially without scattering of light.

In one approach, the Li-containing compound may be present in an amount ranging from about 0.01 wt. % to about 20 wt. %. In another approach, the Li-containing compound may be present in an amount ranging from about 0.01 wt. % to about 1.5 wt. %.

In some approaches, the Li-containing compound may be a $^6$Li-salt of short-chain aliphatic acids. In preferred approaches, the Li-containing compound does not include an aromatic ring. In preferred approaches, the short-chain aliphatic acids have no more than 6 $CH_2$ groups in the chain, e.g., the short-chain aliphatic acids have no more than 6 carbons per molecule thereof. Preferably, the short-chain aliphatic acids do not include aromatic rings, e.g., benzene, phenyl, etc. For example, short-chain aliphatic acids may include formic acid, acetic acid, acrylic acid, propanoic acid, 2-methylacrylic acid, butyric acid, isobutyric acid, 2,3- dimethylacrylic acid, 3,3-dimethylacrylic acid, pentanoic acid, 3-methylbutyric acid, 3,3-dimethylbutyric acid, 4-methylpentanoic acid, hexanoic acid, 4,4-dimethylpentanoic acid, 2-ethylhexanoic acid, heptanoic acid, and nonanoic acid. When excess organic acid is present, these salts will undergo acid-base equilibrium to form complexes that are soluble in non-polar aromatic matrices.

The $^6$Li-salt of short-chain aliphatic acids may be dissolved in polymer. In some approaches, the $^6$Li-salt of short-chain aliphatic acids may be synthesized. The base $^6$Li-compounds used for synthesis, e.g., $^6$Li OH, $^6$Li CO$_3$, etc. are available commercially. Moreover, short-chain aliphatic acids are available commercially, and typically at sufficiently high purity. In one approach, a simple acid-base reaction between the $^6$Li-compounds and the short-chain aliphatic acids produces the $^6$Li-salt, the salt is precipitated out of the reaction. The $^6$Li-salt precipitate is dried and dissolved in a polar solvent. For example only, and not meant to be limiting in any way, in one approach, the $^6$Li-salt of butyric acid could be combined with butyric acid, so the $^6$Li-salt is not in non-polar solvent, e.g., DME, or polymer. The $^6$Li-salt is soluble in the butyric acid, and then the $^6$Li-salt butyric acid mixture may be added to the polymer matrix for forming a plastic. Similar approaches for $^6$Li dissolution in polymers may be used with combinations of other $^6$Li salts with corresponding acids. In various approaches, an effective amount of coordinating polar solvent is used for dissolving the Li-containing compound.

In various approaches, other non-polar solvents, e.g., 1,2-dimethoxyethane (DME), tetrahydrofuran (THF), etc., may be added to dissolve the Li-containing compounds.

Figure 5:
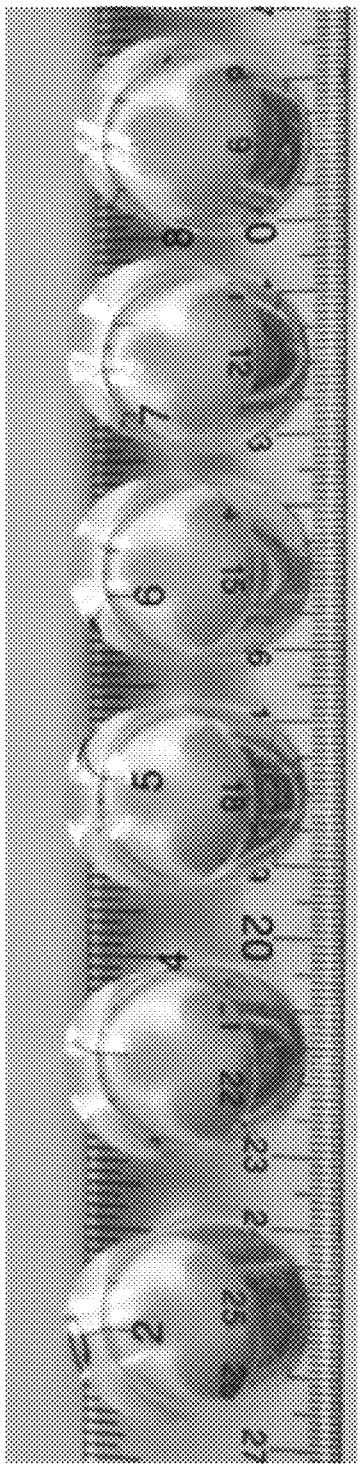
FIG. 5 is an image of $^6$Li-loaded plastics prepared with different short-chain aliphatic acids, according to some inventive aspects.
Figure 5:
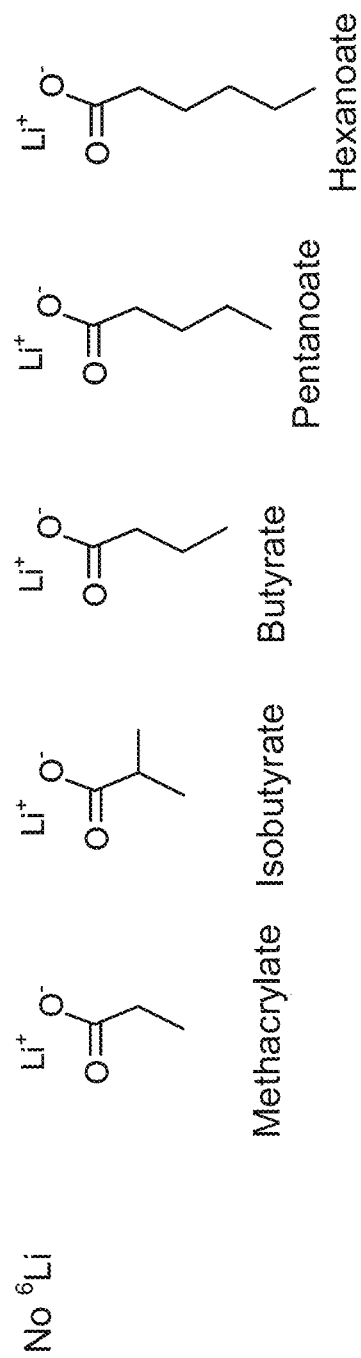

Different from previously used $^6$Li-salts of aromatic acids, the $^6$Li-salts complexed with the respective acids have low self-absorption that diminishes loss of the light output in prepared plastics. FIG. 5 illustrates different $^6$Li-loaded plastics prepared with different short-chain aliphatic acids.

In some approaches, the Li-containing compound may include the following Li salts of an aliphatic acid: lithium-valerate (lithium pentanoate), lithium-2-ethylhexanoate, lithium-propanoate, lithium-butyrate, lithium-isobutyrate, lithium-methacrylate, etc. In more approaches, the Li-containing compounds may include, but are not limited to, Li-acetylsalicylic acid, Li-3,5-di-tert-butylsalicylate, other Li-containing derivatives of carboxylic acids and other such Li-containing compounds as would be understood by one having skill in the art upon reading the present disclosure.

In yet more approaches, the Li-containing compounds may include substituents that promote hydrogen bonding and/or stability with a coordinating solvent (examples of which are provided below). In further approaches, the Li-containing compounds may also include non-polar groups to promote solubility in the aromatic polymer matrix of the plastic scintillators and/or in the aromatic liquid scintillator materials of the liquid scintillators disclosed herein.

In particular approaches, the Li-containing compound may be soluble in a primary fluor present within the plastic scintillators and/or liquid scintillators described herein. For instance, in some approaches, the Li-containing compound may be soluble in a primary fluor, such as biphenyl, naphthalene, PPO and/or other derivatives of oxazole, etc. In more approaches, the Li-containing compound may be soluble in a primary fluor present at <1 wt. %. In still more approaches, the Li-containing compound may be soluble in a primary fluor present at about 0.5 to 10 wt. % or more, an amount ranging from about 10 wt. % to about 30 wt. %, an amount ranging from about 30 wt. % to about 75% wt. %, etc.

Fluors/Dyes

According to various inventive aspects, a primary fluor includes any fluorescent dye that is soluble in the polymer matrix precursor of the scintillator material. In various approaches, fluors, dyes, etc. included in the scintillator material may include scintillation dyes, laser dyes, etc. Moreover, the primary fluor preferably is colorless, e.g., essentially free of color. Dyes selected for approaches of fabricating a scintillator material as described herein are included in Table 1 below. In some approaches, a primary fluor may be soluble in polymer matrix precursor, e.g., PVT, PS, etc. at a concentration from 10 wt. % up to 90 wt. %. The dyes listed in Table 1 are for example only and are not meant to be limiting in any way.

Moreover, a primary fluor preferably also is capable of PSD production. In preferred approaches, dye compounds with high solubility (>30 wt. %) included in PSD in plastic scintillators are referred to as "primary dye."

The secondary dyes listed on Table 1, include a group of Exalite dyes used as waveshifters at relatively low concentrations of 0.1 to 6 wt. %. Exalite dyes are generally known to be used as laser dyes. In some approaches, secondary dyes include coumarin dyes.

In various approaches, non-traditional primary dyes, such as BP, m-TP, TMQ may be used as an alternative to more traditional 2,5-diphenyloxazole (PPO). Non-traditional dyes that do not include oxygen or nitrogen in the compound structure are preferable for PSD compositions that include $^6$Li-salt of short-chain aliphatic acids. Without wishing to be bound by any theory, traditional dyes that include oxygen and/or nitrogen in the structures, e.g., PPO, complex with the $^6$Li-salt compounds prepared from short-chain aliphatic acids and have an adverse effect on the light output (LO) of the prepared PSD plastic.

Preferably, the non-traditional primary dyes do not include an oxygen or nitrogen in the structure of the compound. In some exemplary approaches, the non-traditional primary dyes are pure hydrocarbons. For example, as shown in Table 1 exemplary non-traditional primary dyes may include m-terphenyl (m-TP), derivatives of m-TP, biphenyl (BP), biphenyl derivatives, 2",3,3',3'"-tetramethyl-1,1': 4',1": 4",1'"-quaterphenyl (TMQ), and other derivatives of terphenyl and quaterphenyl, etc. In some approaches, the exemplary non-traditional dyes may be obtained commercially.

In addition to the high solubility needed for the facilitation of the excited Triplet-Triplet (T-T) interaction and Triplet-Triplet Annihilation (TTA) leading to formation of the PSD properties, the new non-traditional dyes are characterized by practical absence of the self-absorption (FIGS. 6A and 6B) that leads to the lower attenuation and higher LO needed for plastic deployment in large-scale detectors (e.g., antineutrino detection).

The properties of individual compounds have been evaluated in plastics containing a single dye and serve as reference points for consideration of the energy transfer phenomena and effects introduced by interactions of multiple components. As shown by the results presented in Table 1, at the low dye concentrations, there is a good correlation between the quantum yield (QY) and LO of the plastics. At 1 wt. %, the low QY BP and m-TP produce the least efficient scintillation compared to brighter TMQ and PPO. At the increased concentration of primary dyes, the correlation is broken by TMQ that, despite the lower QY, produces higher LO compared to PPO. The disproportional change of the LO at the increasing concentration may be explained by spectral characteristics showing almost complete lack of BP, m-TP and TMQ self-absorption in comparison to PPO, which loses a fraction of LO due to the overlap of its PL and

TABLE 1

Molecular weights (MW), structures, room temperature solubility in toluene, and scintillation parameters of individual dyes measured in liquid and solid solutions.

| Compound | M.W. | Solubility % | $QY^1$ | $\lambda_{abs}$,[2] nm | $\lambda_{fl}$,[2] nm | $LO^3$ in PS (a.u.) | |
|---|---|---|---|---|---|---|---|
| Primary dye | | | | | | 1% | 30% |
| Biphenyl | 154 | 50 | 0.18 | 250 | 316 | 0.02 | 0.13 |
| m-Terphenyl | 230 | 30 | 0.29 | 245 | 339 | 0.08 | 0.28 |
| TMQ | 362 | >60 | 0.73 | 265 | 352 | 0.3 | 0.94 |
| PPO | 221 | 42 | 1.0 | 302 | 373 | 0.6 | 0.74 |
| Secondary dye (Exalites) | | | | | | 0.2% in PS | |
| E404 | 658 | ~6 | n/a | 331 | 401 | 0.55 | |
| E411 | 651 | ~8 | n/a | 346 | 408 | 0.55 | |
| E417 | 887 | ~12 | n/a | 352 | 415 | 0.15 | |

[1]Quantum Yield, reference values
[2] Cyclohexane solution
[3]$^{137}$Cs LO relative to 1" × 1" EJ-200 absorption spectra. In addition, the solubility of the non-traditional primary dyes allows a higher concentration of primary dye in the plastic composition. In one approach, a concentration of about 30 wt. % primary dye may be included in the PSD plastic composition.

It was surprising that the non-traditional dyes were useful in the PSD plastic composition since non-traditional dyes, e.g., m-TP, is well known to be less bright than the traditional primary dyes used in scintillation processes, e.g., PPO. It was unexpected that m-TP would be a useful primary dye because m-TP by itself has very low brightness as a fluorescent dye, however, when combined with a secondary dye such as Exalite, the composition of m-TP and Exalite produced a brighter fluorescence than PPO combined with traditional secondary dyes, e. g. bis-MSB, POPOP, or DPA. Without wishing to be bound by any theory, the brighter fluorescence of the m-TP/Exalite allows the $^6$Li in the composition to produce a higher triple PSD.

Figures 6A, 6B:
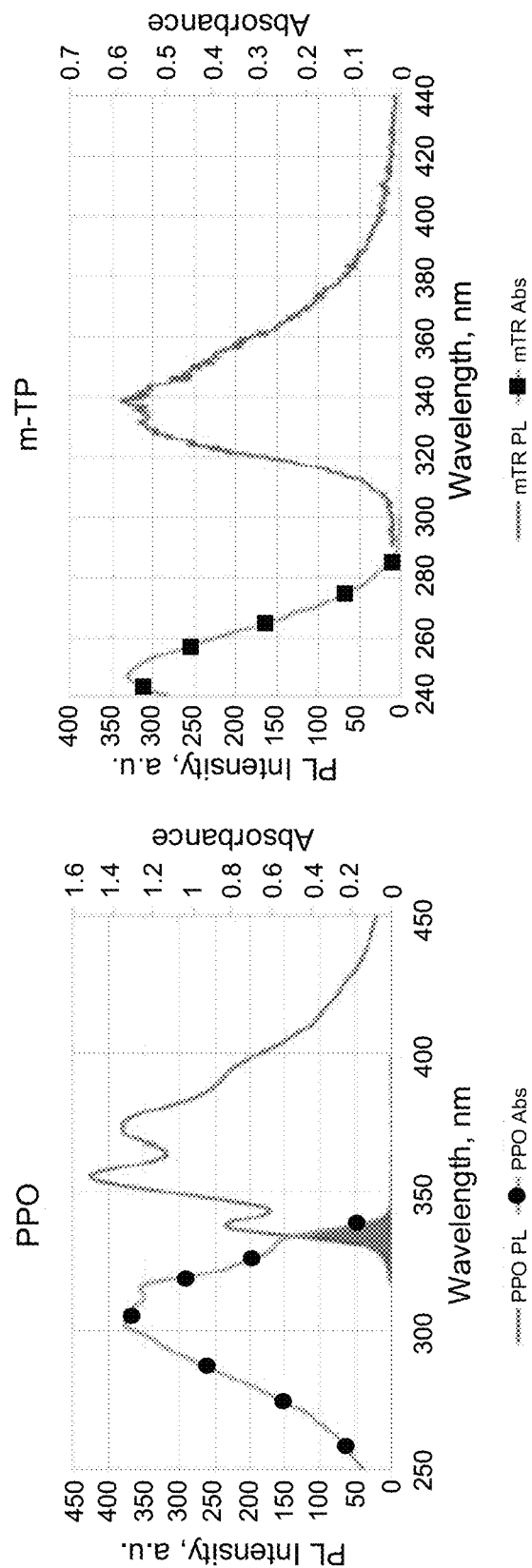
FIG. 6A is a plot of photoluminescence and absorption spectra of PPO, according to one approach.
FIG. 6B is a plot of photoluminescence and absorption spectra of non-traditional primary dyes, according to one approach.

An example of photoluminescence (PL) and absorption spectra of traditional primary dye PPO is shown in FIG. 6A. The overlap of PL and absorption spectra (solid shading) corresponds to the self-absorption that leads to the degradation of light output LO at increasing size of detector. An example of PL and absorption spectra of non-traditional primary dye m-TP is shown in FIG. 6B. The absence of self-absorption in m-TP results in low attenuation and higher LO, allowing for production of large-scale plastics with higher PSD and scintillation performance.

Primary fluors suitable for use in the presently disclosed scintillator systems include any fluor that may be known in the art and capable of exhibiting characteristics for scintillation as described herein. In some approaches, the primary fluor may be present in various concentrations, e.g., about 0.5 to 5 wt. % or more. In more approaches, the primary dye may be present in an amount ranging from about 5 wt. % to 20 wt. % or more. In one approach, the primary dye may be present in an amount ranging from about 5 wt. % to about 40 wt. %. In even more approaches, the primary dye may be present in an amount ranging from about 20 wt. % to 75 wt. %, or an amount ranging from about 30 wt. % to about 75 wt. %. In yet more approaches, the primary dye may be present in an amount ranging from 5 wt. % to 95 wt. %. As disclosed herein in various approaches, the concentrations of fluors are described relative to a weight of the bulk scintillator material.

In one particular approach, a scintillator system may include a primary fluor disposed in a polymer matrix. In some approaches, the primary fluor may be a fluorescent dye present in an amount of 3 to 5 wt. % or more, where such fluorescent dye results in the scintillator material exhibiting an optical response signature for neutrons that is different than an optical response signature for gamma rays.

The primary fluor may be incorporated into the polymer matrix according to any suitable mechanism. For example, in some approaches, the primary fluor may be suspended/dispersed in the polymer matrix. In preferred approaches, there may be a substantially uniform distribution of the primary fluor in the matrix monomer before the polymerization process. In more approaches, the primary fluor may be crosslinked to the polymer matrix. In still more approaches, the primary fluor may be copolymerized with the polymer matrix, and/or with another component of the polymer matrix, etc. as would be understood by one having ordinary skill in the art upon reading the present descriptions. Of course, other arrangements of fluor and polymer matrix may be utilized without departing from the scope of the present descriptions.

In yet another approach, the primary fluor disposed in an organic plastic scintillator material may be 2,5-diphenyl oxazole (PPO). PPO tends to provide a yellow color to the plastic PSD composition, and thus a drawback of using primarily PPO is the yellow color. In other approaches, the primary fluor may include other dyes, e.g., biphenyl, m-terphenyl, TMQ, and the derivatives thereof that produce scintillation response upon the excitation by any types of radiation. In still other approaches, the primary fluor may include mixture of multiple fluorescent dyes.

In one inventive aspect, a scintillator system may include a secondary fluor disposed therein. In various approaches, the primary fluor, dye, etc. may be typically included at elevated concentrations that may decrease the light output of the plastic scintillator material. Thus, in order to compensate for the decrease the light output, in all plastic scintillators, a secondary fluor, dye, etc. may be included to absorb light from the primary fluor and then emits the light at a longer wavelength. In various approaches, the amount of the secondary fluor in the scintillator material is at much lower concentration then the primary fluor, and thus tends to not produce self-absorption and the resulting light output is higher. In one approach, a secondary fluor is preferably a bright compound.

In various approaches, a suitable secondary fluor disposed in the exemplary plastic scintillator systems disclosed herein may be characterized by wavelength-shifting qualities. In some approaches, a plastic scintillator system having a secondary fluor in the presence of another fluor, particularly a primary fluor, may exhibit scintillation light output (LO) or PSD characteristics that are superior to the LO or PSD characteristics of a scintillator system having exclusively the same primary fluor (and no secondary fluor), under otherwise identical conditions. In various approaches, traditional secondary dyes, such as, e. g., bis-MSB (1,4-Bis(2-methylstyryl)benzene), POPOP (1,4-Bis(5-phenyl-2-oxazolyl)benzene), or DPA (9,10-diphenylanthracene) may be used as suitable secondary dyes.

In various approaches, new non-traditional secondary dyes, such as Exalites, coumarins, which may be obtained commercially. In preferred approaches, Exalites compounds are pure hydrocarbons. In one approach, preferred Exalites have preferred properties for plastic PSD compositions, such as soluble, no color, pure hydrocarbon structure, etc. Exemplary examples of Exalites may include E404 [9H-Fluorene, 2,2'-(1,4-phenylene)bis[7-(1,1-dimethylpropyl)-9,9-diethyl], E411 (7,7'-diphenyl-9,9,9',9'-tetrapropyl-2,2'-Bi-9H-fluorene), E417 (7,7''-di-tert-pentyl-9,9,9',9',9'',9''-hexapropyl-9H,9'H,9''H-2,2': 7',2''-terfluorene), etc. In one approach, preferred coumarin dye may include coumarins, e.g. Coumarin 460 (7-diethylamino-4-methylcoumarin), also referred as C1, MDAC, etc. These compounds have been known previously as efficient laser dyes. As described herein, Exalites are useful as a secondary dye for plastic PSD preparations as being more stable and brighter in LO of the plastics. Exalites and coumarins may be sourced commercially. In contrast to other primary and secondary dyes, e.g., fluors, Exalites do not have a yellow color.

In various approaches, a secondary dye includes at least one of the following family of fluorescent dyes: Exalite, coumarin, and a combination of such dyes. In some approaches, the secondary dye may be in the blue region of the optical spectrum. In one approach, the secondary dye may have an emission in a range of about at least 390 nm to about 485 nm.

Looking back, Table 1 includes physical characteristics of secondary dyes in terms of molecular weights, solubility, and scintillation efficiency. The listed secondary dyes at 0.2 wt. % concentration show high scintillation efficiency, with slight variations that may also relate to their absorption relatively to the PS fluorescence peak. The QY of E404 and E417 has not been measured but based on their brightness in comparison to the traditional dyes, can be assumed close to a unity.

Figure 7:
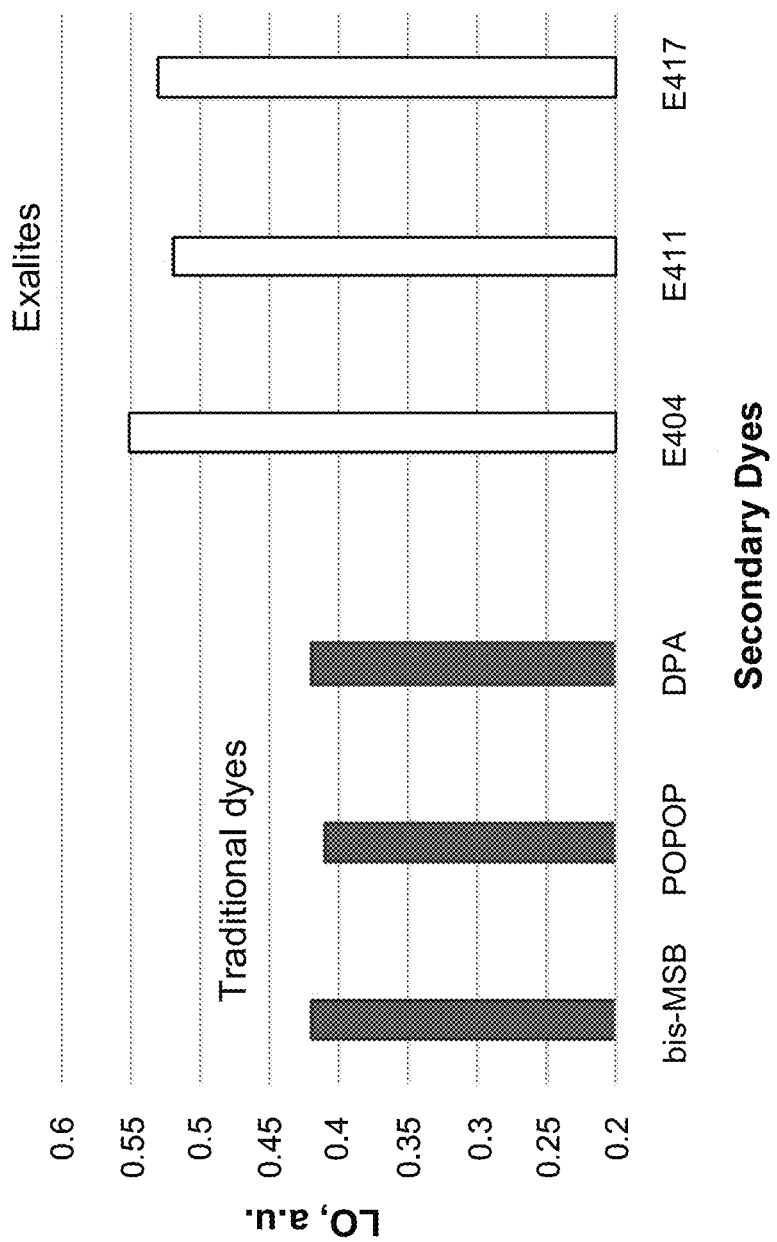
FIG. 7 shows light output (LO) measured for different secondary dyes in transparent polystyrene plastics, according to one approach.

FIG. 7 is a bar graph showing the light output (LO) measured for different secondary dyes dissolved in transparent polystyrene plastics at 0.2 wt. % concentration. These results show the higher LO of the new Exalites compared to the traditional secondary dyes (waveshifters) historically used in plastic scintillator preparations. Thus, these results demonstrate the higher scintillation efficiency of these dyes in comparison with the regular waveshifters, like bis-MSB, POPOP, or DPA, traditionally used in plastic preparation for more than six decades. In addition to the higher brightness, the Exalites also have low self-absorption and relatively high solubility that enables higher resistance to dye precipitation and leaching.

According to some approaches, the exemplary organic plastic scintillators and/or organic liquid scintillators may include a secondary fluor in a low concentration in order to maximize the beneficial wavelength-shifting effects for PSD performance. For example, the secondary fluor may be present in an amount of about 2 wt. % or less, in one approach. More soluble and low-self-absorption secondary dyes (e.g., Exalites, coumarin, etc.) may be present in the scintillator material in a range of about 0.01 wt. % to about 6% wt. %.

Initiators and Cross-Linkers

In some approaches, the scintillators disclosed herein may also comprise a polymerization initiator and/or a cross-linker. Suitable polymerization initiators may include, but are not limited to, organic peroxides, Luperox 231, etc. or other such initiators as would be understood by one having skill in the art upon reading the present disclosure. Suitable cross-linkers may include, but are not limited to, aromatic cross-linkers such divinyl benzene, divinyl toluene, trivinyl benzene, divinyl naphthalene, etc.; aliphatic cross-linking monomers such as di- and polyacrylates and methacrylates, etc.; and other such cross-linkers as would be understood by one having skill in the art upon reading the present disclosure.

In additional approaches, the initiator may be present in an amount ranging from about 0.001 wt. % to about 1 wt. %. In further approaches, the cross-linker may be present in an amount ranging from about 0.05 wt. % to about 5 wt. %.

Examples of Fabricating Plastic Scintillators

Several illustrative examples of fabricating non-PSD scintillators capable of detecting thermal neutrons, and PSD scintillators capable of simultaneously detecting thermal and fast neutrons discriminated from gamma radiation background, are described below. It is important to note that these illustrative fabrication methods are in no way limiting and are provided by way of example only.

Figure 8:
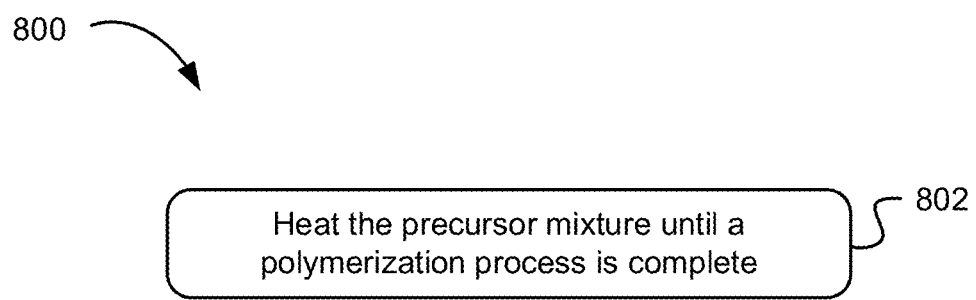
FIG. 8 shows a flowchart of a method of fabricating a scintillator according to one inventive aspect.

FIG. 8 depicts a method 800 of fabricating a plastic scintillator according to one inventive aspect. As an option, the present method 800 may be implemented to form the scintillators disclosed herein, such as those shown in the other FIGS. Further, the method 800 may be carried out in any desired environment. Moreover, more or less operations than those shown in FIG. 8 may be included in method 800, according to various approaches. It should also be noted that any of the aforementioned features may be used in any of the approaches described in accordance with this method and others disclosed herein.

According to one approach, a method of fabricating a scintillator material includes creating a solid structure including the polymer matrix having the primary dye, the secondary dye, and the Li-containing component therein. As shown in FIG. 8, a scintillator precursor mixture may be placed in a heating vessel, and subsequently heated until a polymerization process has completed, as described in operation 802. In one approach, the precursor mixture may be heated up to at least a temperature of about 80° C.

In one approach of operation 802, the precursor mixture may include a polymer matrix precursor, e.g., a monomer, mixture of monomers, etc., one or more fluors, a coordinating solvent, and a Li-containing compound, wherein the Li-containing compound is soluble in the coordinating solvent and/or at least one of the one or more fluors. The polymer matrix precursor may be present in an amount ranging from about 60 wt. % to about 95 wt. % of the precursor mixture. The one or more fluors include at least one primary fluor and a secondary fluor. The primary fluor may be present in an amount ranging from about 5 wt. % to about 40 wt. %. Preferably, the primary fluor is soluble in the polymer matrix precursor. The secondary fluor may be present in a range of about 0.2 wt. % to about 6 wt. %. In some approaches, the precursor mixture includes a polymerization initiator. The amount of initiator may be in a range of about 0.001 wt. % to about 1.0 wt. % in the precursor mixture.

As described herein, the Li-containing compound is a salt of an aliphatic acid having no more than 6 carbons per molecule thereof. In preferred approaches, the Li-containing compound is a $^6$Li salt of a short-chain aliphatic acid. In preferred approaches, the coordinating solvent may be a polar solvent. For example, the coordinating solvent may include one of the following: butyric acid, propanoic acid, methacrylic acid, etc.

In one approach, a preparation of a $^6$Li-loaded plastic scintillator material includes an amount of a $^6$Li salt of a short-chain aliphatic that corresponds to a desired concentration of $^6$Li atom. In preferred approaches, the plastic PSD composition includes an exemplary range of about 0.1 wt. % to about 0.5 wt. % atomic $^6$Li. In one approach, a minimum concentration of $^6$Li atom is 0.1 wt. % of the plastic PSD composition. In some approaches, the $^6$Li salt is added to the following compositions involving combinations of compounds and non-traditional primary and secondary dyes.

In some approaches, the monomer may be capable of polymerizing and solvating the one or more fluors. In one particular approach, the monomer may comprise one or more aromatic groups. In another approach, the monomer may be nonaromatic. In yet another approach, the monomer may be non-polar. In a further approach, the monomer may be polar. In particular approaches, the monomer may comprise at least one of a 4-methylstyrene, a vinyltoluene, a styrene, a methylmethacrylate, a methacrylic acid precursor, and any other such monomer or their mixture as would be understood by one having skill in the art upon reading the present disclosure.

Figure 9A:
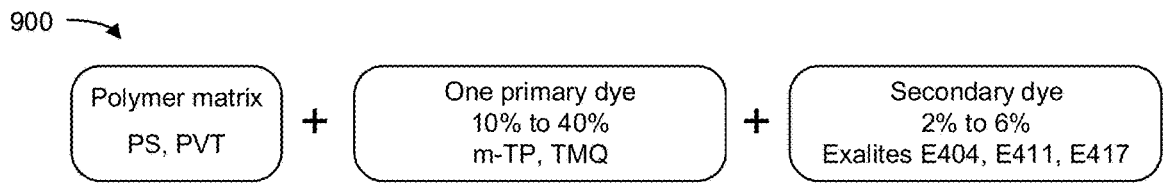
FIG. 9A illustrates a PSD composition having one primary dye, according to one approach.

In one approach, a PSD composition may include one primary dye. As illustrated in FIG. 9A, a PSD composition 900 may include a polymer matrix, e.g., PS, PVT, etc.; one primary dye, e.g., m-TP, TMQ, etc.; and one secondary dye, e.g., Exalites E404, E411, E417, etc. A concentration of the primary dye may be in a range of about 10 to about 40 wt. % of total PSD composition. A concentration of the secondary dye may be in a range of about 0.2 to about 6 wt. % of total PSD composition.

Addition of bright secondary dyes at a small concentration is a typical practice used for enhancement of LO in all mixed organic scintillators. For a plastic scintillator that includes a matrix, a primary dye and a secondary dye (waveshifter), the dyes may be selected to satisfy the energetic condition of $S_{1(matrix)} > S_{1(primary\ dye)} > S_{1(waveshifter)}$ that allows for the singlet energy transfer from the initially excited matrix to the lowest $S_1$ of the waveshifter that emits the final light. It is generally understood that due to the low concentrations and relatively large intermolecular distances (~32-38 Å at ~1%) in traditional non-PSD plastics, the $S_1$ energy transfer between the dyes may include a large fraction of the radiative process that is maximized by the fluorescence efficiency of both primary and secondary dyes. In high-concentration plastics, the decreasing intermolecular distances (~9-13 Å for 30%) may lead to a larger contribution from the non-radiative Forster and Dexter components that increase the overall efficiency of the $S_1$ energy transfer. Studies of PS-based plastics have shown that the non-radiative $S_1$ transfer already becomes dominant at dye concentrations as low as 4% by weight. Without wishing to be bound by any theory, it is believed that at concentrations of 30% and higher, the fraction of non-radiative transfer between dyes may be close to unity. Under these conditions of the efficient transfer between the dyes, the intensity of the final fluorescence may be determined mainly by the secondary dye, which is preferably selected to have the highest scintillation efficiency.

In preferred approaches, the scintillator material is optically transparent, where the material is substantially free, e.g., greater than 99% free of grain boundaries or light scatter defects. In some cases, plastic prepared with a combination of a traditional primary dye, e.g., PPO, and a traditional secondary dye, e.g., DPA, results in a lower LO and a decreased neutron to gamma (n/g) separation (not preferred). However, in a preferred approach, secondary dyes such as Exalites having low self-adsorption, a combination of a non-traditional primary dye, e.g., m-TP, with an Exalite secondary dye, e.g., E404, may lead to gradual LO enhancement accompanied by an opposite effect of the neutron to gamma separation decline.

According to one inventive aspect, the scintillator material may be configured to exhibit a pulse-shape discrimination (PSD) figure of merit (FOM) of about at least 1.0 and may be higher. In various approaches, the performance metric of FOM is sufficient to distinguish neutrons, e.g., fast neutrons and thermal neutrons, from gammas down to a few hundred keV/gamma equivalent regime.

Figures 10A, 10B, 10C:
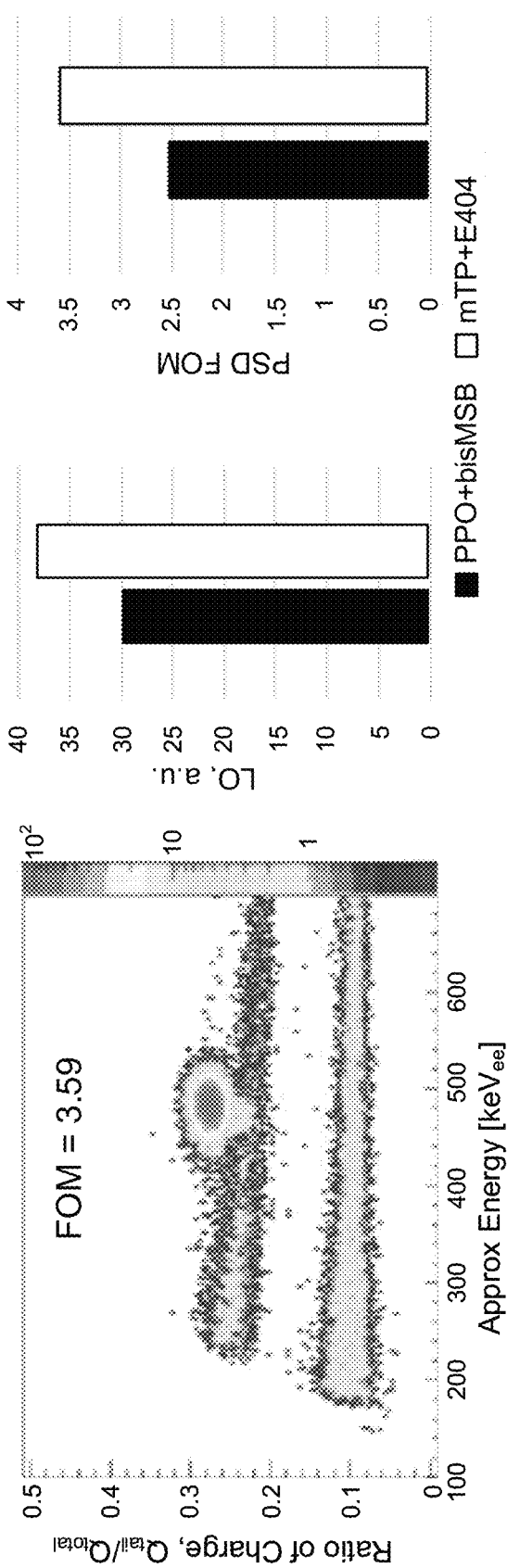
FIG. 10A is a triple PSD distribution of a plastic cylinder prepared with a PSD composition having a single non-traditional primary dye, according to one approach.
FIG. 10B is a plot of measured light output (LO) of a plastic prepared with a non-traditional dye compared with a plastic having the composition of 30% PPO with the traditional dye bis-MSB, according to various approaches.
FIG. 10C is a plot of PSD FoM of prepared with a non-traditional dye compared with a plastic having the composition of 30% PPO with the traditional dye bis-MSB, according to various approaches.

An example of scintillation performance of a PSD composition having one non-traditional primary dye is shown in FIGS. 10A-10C. The triple PSD distribution of a Ø1'×1' plastic cylinder prepared using 1.5% $^6$LiIBA, 30% m-TP, and 1% E404 dissolved in polystyrene is shown in FIG. 10A. FIG. 10B illustrates the higher measured LO of the plastic having m-TP non-traditional dye in comparison to a composition containing 30% PPO with the traditional dye bis-MSB. FIG. 10C illustrates the PSD FoM of the plastic having m-TP non-traditional dye in comparison to a composition containing 30% PPO with the traditional dye bis-MSB.

Figure 9B:
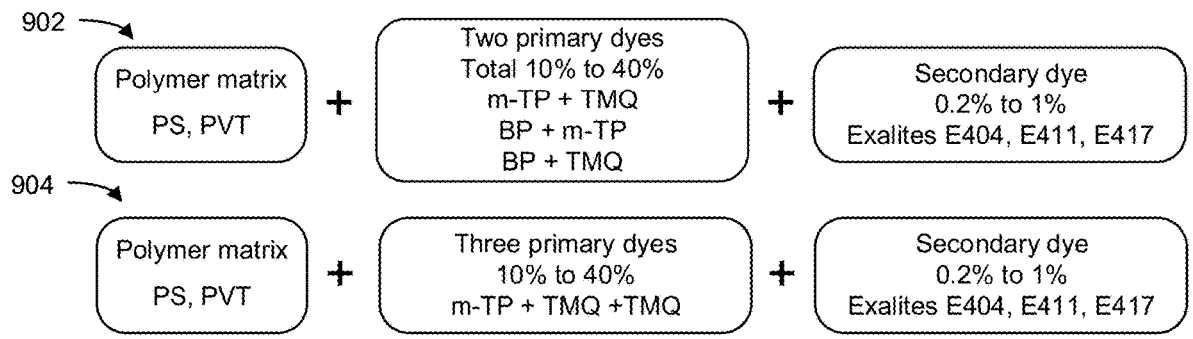
FIG. 9B illustrates PSD compositions having more than one primary dyes, according to various approaches.

In one approach, a PSD composition may include more than one primary dye. As illustrated in FIG. 9B, in one approach, a PSD composition having a combination of two primary dyes 902 may include a polymer matrix, e.g., PS, PVT, etc.; two primary dyes, e.g., m-TP, TMQ, etc.; and one secondary dye, e.g., Exalites E404, E411, E417, etc. In various approaches, the combination of primary dyes may include m-TP and TMQ, BP and m-TP, BP and TMQ, etc. A total concentration of the combined primary dyes may be in a range of about 10 to about 40 wt. % of total PSD composition. A concentration of the secondary dye may be in a range of about 0.2 to about 1 wt. % of total PSD composition.

In one approach, a plastic formed with more than one primary dye may not adversely affect production of PSD and/or n/g separation. FIG. 11A shows results obtained with plastics including the pair of BP-m-TP that have close $T_1$ energies. Overlaying the normalized charge ratio distributions of plastics formed with 30% of primary dyes including either m-TP alone or BP-m-TP mixtures and each with small additions of E404 (at 0.2 wt. %) shows increased LO without producing a large effect on n/g separation. Moreover, in mixed 30% compositions, primary dyes BP and m-TP may be exchangeable, acting like one dye in producing PSD close to that of plastic containing 30% of the longer wavelength emitting dye m-TP. Without wishing to be bound by any theory, it is believed that the primary dye mixtures, BP and m-TP equally participate in the TTA process behaving like a single dye with the molecules cooperating in production of PSD determined not by the individual dye but by the total concentration of both compounds.

Figure 11B:
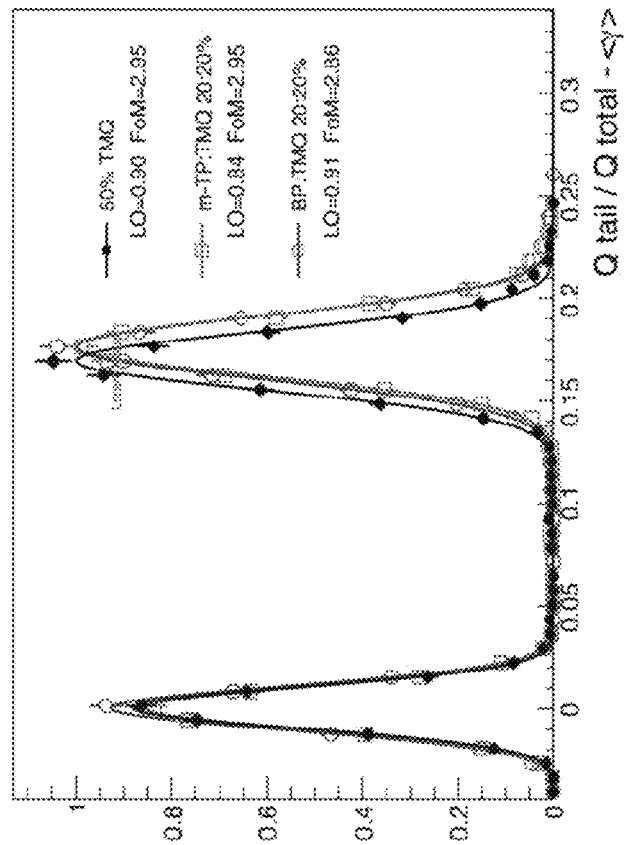
FIG. 11B is a plot of a normalized charge ratio distribution measured with plastics containing 40 wt. % non-traditional primary dye mixtures, or 50 wt. % of TMQ primary dye alone, according to one inventive aspect.
Figure 11A:
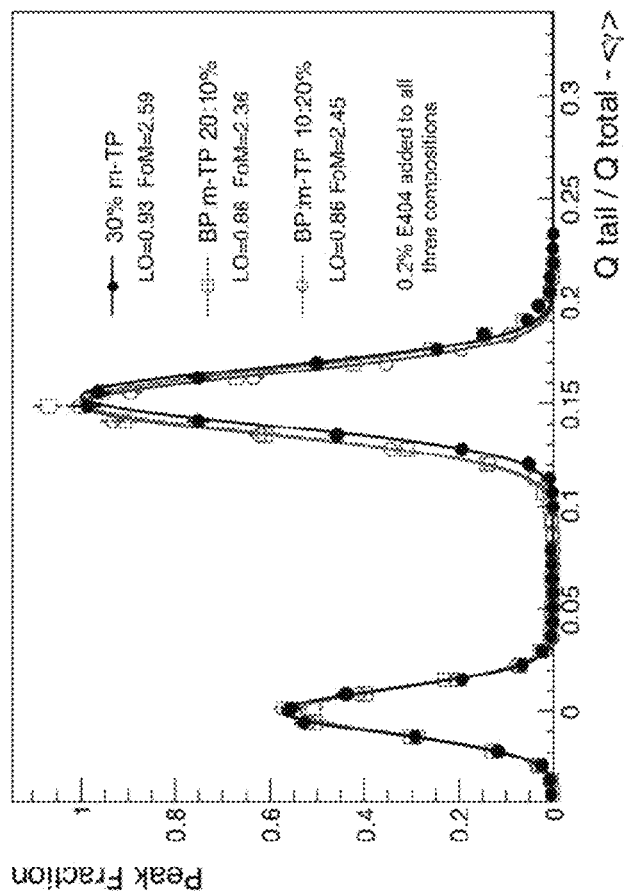
FIG. 11A is a plot of a normalized charge ratio distribution measured with plastics containing 30 wt. % non-traditional primary dye mixtures, according to one inventive aspect.

Similar examples of primary dyes participating in cooperative production of PSD may be demonstrated in pairs of m-TP-TMQ and BP-TMQ as shown in FIG. 11B. As shown with 40% of m-TP-TMQ and BP-TMQ mixtures, each mixed sample exhibits a high degree of n/g separation and PSD that is typically not achievable with 20% of each individual dye. These results indicate cooperative interaction of dyes in product of PSD better than that of 50% of TMQ alone.

As illustrated in FIG. 9B, in one approach, a PSD composition having a combination of three primary dyes 904 may include a polymer matrix, e.g., PS, PVT, etc.; three primary dyes, e.g., BP+m-TP+TMQ; and a secondary dye, e.g., Exalites E404, E411, E417, etc. A total concentration of the combined primary dyes may be in a range of about 10 to about 40 wt. % of total PSD composition. A concentration of the secondary dye may be in a range of about 0.2 to about 1 wt. % of total PSD composition.

Without wishing to be bound by any theory, it is believed that the close energies of the triplet excited states of the non-traditional primary dyes (2.83 eV, 2.81 eV and 2.75 eV, for BP, m-TP and TMQ, respectively) enable the heterogeneous TTA between all primary dye molecules in the mixture. In an unexpected result, the mixtures of the individual dyes used at the decreased concentrations may perform as one single dye at the total high concentration needed for formation of the efficient PSD. The use of the mixtures produces benefits for easier incorporation of $^6$Li compounds, diminishing, at the same time, the probability of dye precipitation and leaching.

Figure 9C:
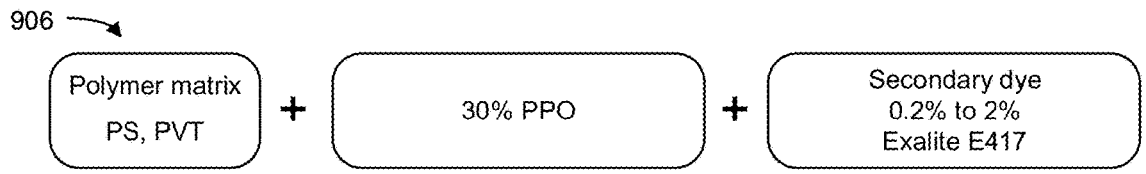
FIG. 9C illustrates a PSD composition having the primary dye PPO in combination with an Exalite, according to one approach.

In one approach, a PSD composition may include PPO in combination with an Exalite, e.g., E411, E417, etc. As illustrated in FIG. 9C, a PSD PPO/Exalite composition 906 may include a polymer matrix, e.g., PS, PVT, etc.; the primary dye PPO; and a secondary Exalite dye, e.g., E417, etc. A concentration of PPO may be in a range of about 30 wt. % of total PSD composition. A concentration of the secondary dye, e.g., Exalite, may be in a range of about 0.2 to about 2 wt. % of total PSD composition.

In one approach, the PSD PPO/Exalite composition 906 may be beneficial for preparation of smaller-scale plastics, in which self-absorption of PPO is compensated by increased PSD and high LO introduced by Exalite E417.

In even more approaches, the precursor mixture may further include at least one of an initiator (e.g., Luperox 231) and a cross-linker (e.g., divinylbenzene).

After the scintillator precursor mixture has been placed in the heating vessel, and subsequently heated until a polymerization process has completed (e.g., operations 802 and 804), the resulting scintillator may exhibit an optical response signature for thermal neutrons that is different than an optical response signature for fast neutrons and gamma rays in various approaches. Moreover, the resulting scintillator may be substantially free of grain boundaries (e.g., it is homogenous) and optically transparent in preferred approaches.

Examples of Plastic Scintillator Preparation with Non-Traditional Dyes

Example 1: PSD-One Primary Dye Plastic Scintillator

In one approach, a colorless, optically transparent PSD plastic scintillator includes:
- about 30 wt. % m-TP, as a primary fluor
- about 0.5 wt. % of Exalite E404, as a secondary fluor
- about 1.5 wt. % of $^6$Li-isobutyrate ($^6$Li-IBA), as a thermal neutron capture reagent
- about 6 wt. % of isobutyric acid
- about 0.05-5 wt. % divinylbenzene (DVB) as a cross-linker for added stability
- about 0.01-2 wt. % Luperox 231 (initiator)
- polystyrene (PS) or polyvinyl xylene (PVT)

The materials are added to a wide mouth glass vessel under oxygen free conditions in a nitrogen filled or argon filled glovebox or tightly sealed vessel.

Subsequently, the vessel was sealed and placed in an oven at about 60° C. The sealed vessel was allowed to cure undisturbed for about 24 hours, followed by curing at 65° C. for 1 day, and 70° C. for 1 day, and a final curing step at about 70 to 75° C. for 5 days to polymerize; after which, the resulting plastic scintillator was cooled to room temperature and removed from the vessel. The resulting plastic scintillator was rigid, homogenous, and transparent and exhibited scintillation detection properties for thermal neutrons and fast neutron discriminated from gamma radiation background by at least pulse shape discrimination measurements.

Example 2: PSD-Two Primary Dyes Plastic Scintillator

In one approach, a colorless, optically transparent PSD plastic scintillator includes:
- about 10 wt. % BP+20 wt. % m-TP, as a primary fluors
- about 0.5 wt. % of Exalite E411, as a secondary fluor
- about 1.3 wt. % $^6$Li-propanoate ($^6$LiPrA), as a thermal neutron capture reagent
- about 6 wt. % of propanoic acid
- about 0.05-5 wt. % DVB, as a cross-linker for added stability
- about 0.01-2 wt. % Luperox 231 (initiator)
- balance of PS or PVT The materials are added to a wide mouth glass vessel under oxygen free conditions in a nitrogen filled or argon filled glovebox or tightly sealed vessel.

Subsequently, the vessel was sealed and placed in an oven at about 60° C. The sealed vessel was allowed to cure undisturbed for about 24 hours, followed by curing at 65° C. for 1 day, and 70° C. for 1 day, and a final curing step at about 70 to 75° C. for 5 days to polymerize; after which, the resulting plastic scintillator was cooled to room temperature and removed from the vessel. The resulting plastic scintillator was rigid, homogenous, and transparent and exhibited scintillation detection properties for thermal neutrons and fast neutron discriminated from gamma radiation background by at least pulse shape discrimination measurements.

Example 3: PSD-PPO/Exalite Plastic Scintillator

In one approach, a colorless, optically transparent PSD plastic scintillator includes:
- about 36 wt. % PPO, as a primary fluor
- about 0.5 wt. % of Exalite E417, as a secondary fluor
- about 2.4 wt. % $^6$Li-2-ethylhexanoate, as a thermal neutron capture reagent
- about 5 wt. % THF (tetrahydrofuran)
- about 0.05-5 wt. % DVB, as a cross-linker for added stability
- about 0.01-2 wt. % Luperox 231 (initiator)
- balance of PS or PVT.

Example 4: PSD-PPO/Exalite Plastic Scintillator

In one approach, a colorless, optically transparent PSD plastic scintillator includes:
- about 10-30 wt. % PPO, as a primary fluors
- about 0.1-1.0 wt. % of Exalite E411, as a secondary fluor
- about 1.8 wt. % $^6$Li-pentanoate ($^6$LiVAL), as a thermal neutron capture reagent
- about 4-6 wt. % of isobutyric acid
- about 0.05-5 wt. % DVB, as a cross-linker for added stability
- about 0.01-2 wt. % Luperox 231 (initiator)
- balance of PS or PVT The materials are added to a wide mouth glass vessel under oxygen free conditions in a nitrogen filled or argon filled glovebox or tightly sealed vessel.

Subsequently, the vessel was sealed and placed in an oven at about 60° C. The sealed vessel was allowed to cure undisturbed for about 24 hours, followed by curing at 65° C.

for 1 day, and 70° C. for 1 day, and a final curing step at about 70 to 75° C. for 5 days to polymerize; after which, the resulting plastic scintillator was cooled to room temperature and removed from the vessel.

The composition of Example 3 results in PPO having a synergistic effect with Exalite E417 and produces unexpectedly high PSD and LO above other compositions including PPO. The resulting plastic scintillator was rigid, homogenous, and transparent and exhibited scintillation detection properties for thermal neutrons and fast neutron discriminated from gamma radiation background by pulse shape discrimination measurements.

With respect to physical properties, such as hardness or transparency, the new $^6$Li-containing plastic scintillators disclosed herein are similar to conventional plastic scintillators. The new Li-containing plastic scintillators do not demonstrate any obvious signs of physical instability or scintillation performance degradation. Measurements of PL spectra and decay characteristics showed that new Li-containing plastic scintillators have luminescence and prompt lifetimes<2 ns, that are determined by the final emission occurring from the molecules of Exalites.

In additional approaches, the scintillator may be a component of a scintillator radiation detector system that includes a processing device configured to process pulse traces corresponding to light pulses form the scintillator. In various approaches, the processing device may be further configured to generate radiological image data based on the pulse traces.

According to yet another inventive aspect, a method may include processing pulse traces corresponding to light pulses from a scintillator material; and outputting a result of the processing, where the scintillator material includes a polymer matrix, a primary dye in the polymer matrix, a secondary dye, and a Li-containing compound in the polymer matrix where the Li-containing compound includes a Li salt of a short-chain aliphatic acid as described herein. The system may include a photodetector for detecting the response of the material to fast neutron and thermal neutron irradiation. In one approach, the photodetector may detect gamma ray irradiation. The system may also include a processor and logic integrated with and/or executable by the processor, the logic being configured to perform a discrimination method for processing an output of the photodetector using pulse shape discrimination (PSD) for differentiating responses of the material to the fast neutron and thermal neutron irradiation. In one approach, the system may process an output of the photodetector using PSD for determining the response of the material to gamma ray irradiation.

Figure 12C:
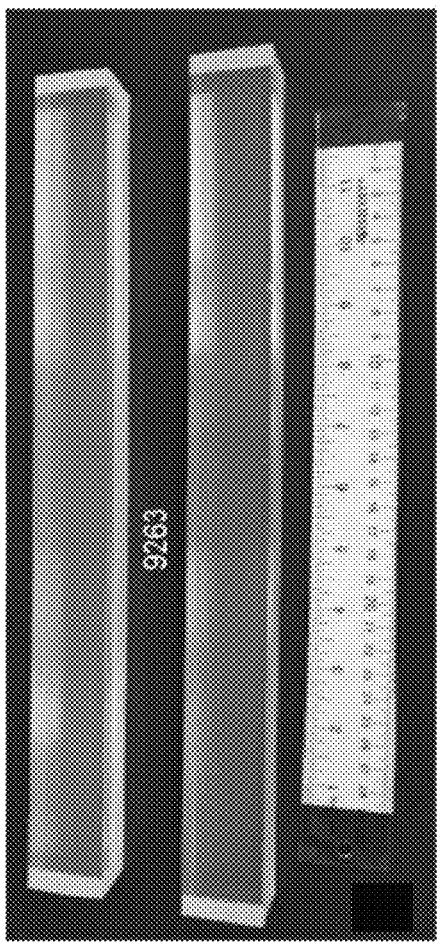
FIGS. 12A-12C are images of shapes of plastic PSD scintillators, according to various approaches.
Figure 12B:
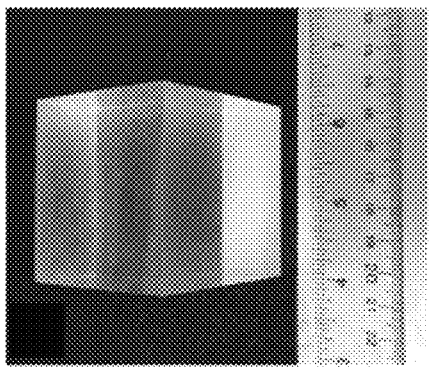
Figure 12A:
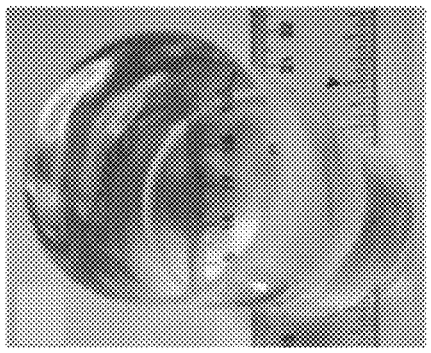

Applications in Neutron Detectors $^6$Li-loaded plastics prepared using the described compounds and compositions have been scaled and tested for applications in neutron detectors (FIGS. 12A-12E). Plastic PSD scintillators have been formed of various shapes (" represents inches), for example, a 2"×3" cylinder as shown in FIG. 12A, a 2.5 #cube in FIG. 12B, a series of 1"×1"×14" rods as shown in FIG. 12C.

Figure 12E:
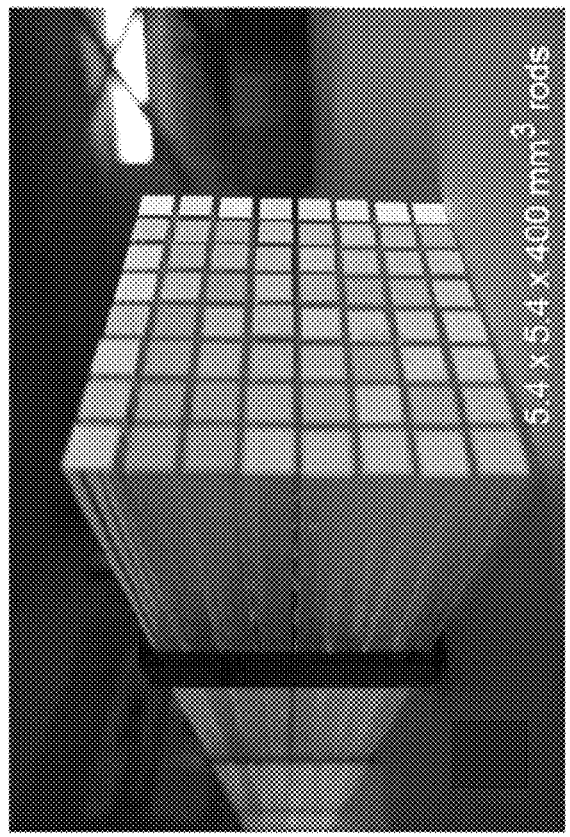
FIG. 12E is an image of a pixelated unit of plastic PSD scintillators, according to one approach.
Figure 12D:
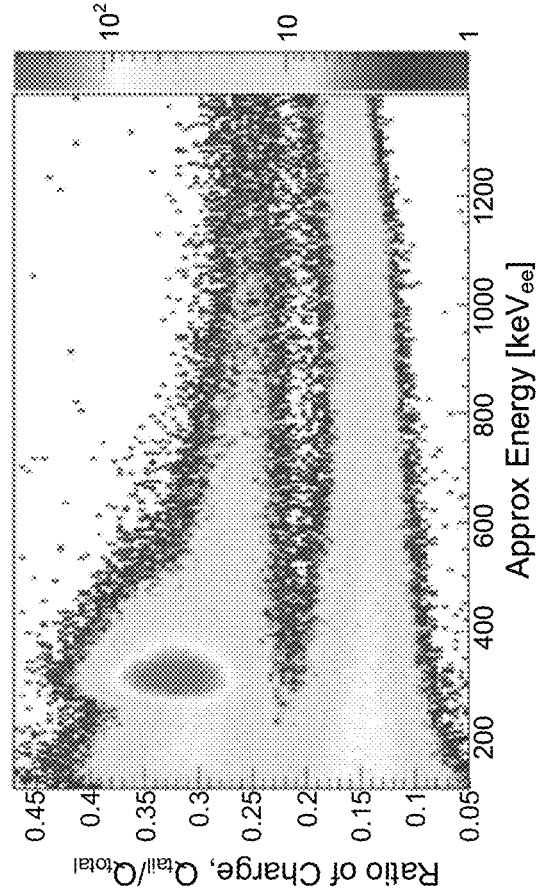
FIG. 12D is a triple PSD distribution of a 14"-long plastic PSD scintillator, according to one approach.

FIG. 12D is a triple PSD distribution of a plastic PSD scintillator in the shape of a 1'×1"×14" rod (as shown in FIG. 12C). FIG. 12E represents a pixelated unit assembled for tests of antineutrino detection development. Various approaches may be transferred to commercial production.

Materials Sources and Preparations

Organic dyes TMQ (2",3,3',3'''-tetramethyl-1,1': 4'1": 4",1'''-quaterphenyl), Bis-MSB (1,4-bis(2-methylstyryl)benzene), E404 (Exalites 404, 1,4-bis(9,9-diethyl-7-(tert-pentyl)-9H-fluoren-2-yl)benzene), and E417 (7,7"-di-tert-pentyl-9,9,9',9',9''',9'''-hexapropyl-9H,9'H,9''H-2,2': 7',2''-terfluorene) may be purchased from Exciton/Luxottica (Lockbourne, OH) and used as received. BP (biphenyl) and tert-BBP (4 tert-butylbiphenyl) is produced by TCI and PPO is produced by Acros Organics (Thermo Fisher Scientific, New Jersey) and can also be used without further purification. m-TP (m-terphenyl) is available from Sigma Aldrich (St. Louis, MO) and should be purified by repeated crystallization from acetone or toluene. Plastic scintillators can be prepared using polystyrene (PS) as a polymer matrix, although the effects considered in various approaches were found to be similar with plastics based on PVT (polyvinyltoluene).

To prepare plastic scintillators, styrene monomer was de-inhibited and purified by eluting through a column of basic alumina on top of silica. Dissolved oxygen was removed by sparging with dry nitrogen. The precursor solutions containing monomer, dyes, and initiator were prepared in pre-cleaned glass containers in a nitrogen-filled glovebox, then were sealed and transferred to a nitrogen-purged oven for polymerization. Also, 5% DVB (divinylbenzene) used as a crosslinker was added to all tested compositions. After polymerization, the resulting solidified plastic cylinders were retrieved by breaking the glass containers and were polished to a standard size of 025 mm×~17 mm (thickness). All concentrations below are listed in percentage (wt %) relative to the total weight of a plastic sample. To minimize the effects of slight variations in material purity and preparation conditions, quantitative comparison of results in most cases was made with the samples obtained in one set of polymerizations.

Photoluminescence (PL) of all individual compounds were measured by FluoroMax®-4 spectrofluorometer (Horiba, Edison, NJ) with diluted solutions in cyclohexane, to obtain digital data used for evaluation of spectral overlaps of dyes in mixtures. The scintillation LO efficiency was obtained from the position of the Compton edge in the $^{137}$Cs spectra, in which 477 keVee (electron-equivalent energy) was defined by 50% of the Compton edge peak. Relative LO of different samples was evaluated by comparison to a 17 mm thick EJ-200 plastic scintillator (Eljen Technology, Sweetwater, TX), LO of which was taken as a unity. Neutron detection properties were studied with a $^{252}$Cf source using measurement techniques described in a previous work.

Quantitative evaluation of PSD was made using Figures of Merit (FoM)

$$FoM=S/(\delta_{gamma}+\delta_{neutron})$$

where S is the separation between gamma and neutron peaks, and $\delta_{gamma}$ and $\delta_{neutron}$ are full widths at half maximum (FWHM) of the corresponding peaks. The FWHM and mean values for the gamma and neutron distributions were extracted from Gaussian fits. Width and position of the time gates used for integration were optimized for the energy range to achieve the highest FoM.

The first triplet excitation energy of TMQ was calculated using many-body perturbation theory within the GW approximation and the Bethe-Salpeter equation (GW+BSE) using the FHI-aims code with aug2tier2 basis sets. Density functional theory (DFT) with the Perdew-Burke-Ernzerhof (PBE) exchange-correlation was chosen as the mean-field starting point for the non-self-consistent GW calculation. The BSE was solved within the Tamm-Dancoff approximation (TDA), using 30 occupied states and 30 unoccupied states.

Applications and Uses

Various aspects of the present invention may be used in a wide variety of applications, and potentially any application in which high light yield and/or pulse shape discrimination between gammas, fast and thermal neutrons, charged particles, etc. is useful.

Illustrative uses of various approaches of the present invention include, but are not limited to, applications requiring radiation detection. Detection, surveillance, and monitoring of radioactive materials, including identification of special nuclear materials (SNM), are a few such examples. Various approaches can also be used in the nuclear fuel cycle, homeland security applications, nuclear non-proliferation, space exploration, medical imaging, special nuclear material, high energy physics facilities, etc.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

Further applications include antineutrino detection, radiography, dosimetry, space exploration, and scientific research.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed is:

1. A scintillator material, comprising:
a polymer matrix;
a primary dye in the polymer matrix, the primary dye being a fluorescent dye;
a secondary dye comprising an exalite dye; and
a Li-containing compound in the polymer matrix, wherein the Li-containing compound is a Li salt of a short-chain aliphatic acid,
wherein the scintillator material exhibits an optical response signature for thermal neutrons that is different than an optical response signature for fast neutrons.

2. The scintillator material as recited in claim 1, wherein the polymer matrix is a solid polymer matrix.

3. The scintillator material as recited in claim 1, wherein the primary dye includes multiple types of fluorescent dyes.

4. The scintillator material as recited in claim 1, wherein the primary dye is present in an amount ranging from about 5 wt. % to about 95 wt. %.

5. The scintillator material as recited in claim 1, wherein the secondary dye comprises a coumarin dye.

6. The scintillator material as recited in claim 1, wherein the secondary dye is present in an amount ranging from about 0.01 wt. % to about 6.0 wt. %.

7. The scintillator material as recited in claim 5, wherein the secondary dye is a laser dye.

8. The scintillator material as recited in claim 1, wherein the short-chain aliphatic acid has no more than 6 carbons per molecule thereof.

9. The scintillator material as recited in claim 1, wherein the Li-containing compound is selected from the group consisting of: lithium-valerate, lithium-2-ethylhexanoate, lithium-propanoate, lithium-butyrate, lithium-isobutyrate, and lithium-methacrylate.

10. The scintillator material as recited in claim 1, wherein the Li-containing compound is a Li-salt of the short-chain aliphatic acid selected from the group consisting of: formic acid, acetic acid, acrylic acid, propanoic acid, 2-methylacrylic acid, butyric acid, isobutyric acid, 2,3-dimethylacrylic acid, 3,3-dimethylacrylic acid, pentanoic acid, 3-methylbutyric acid, 3,3-dimethylbutyric acid, 4-methylpentanoic acid, hexanoic acid, 4,4-dimethylpentanoic acid, 2-ethylhexanoic acid, heptanoic acid, and nonanoic acid.

11. The scintillator material as recited in claim 1, wherein the Li-containing compound is present in an amount corresponding to a concentration of the Li atom, wherein the Li atom is present in an amount ranging from about 0.1 wt. % to about 0.5 wt. %.

12. The scintillator material as recited in claim 1, wherein the scintillator material is configured to exhibit a pulse-shape discrimination (PSD) figure of merit (FOM) of about at least 1.0.

13. The scintillator material as recited in claim 1, wherein the scintillator material is optically transparent.

14. The scintillator material as recited in claim 1, wherein the secondary dye is a pure hydrocarbon.

15. A system, comprising:
the scintillator material as recited in claim 1;
a photodetector for detecting the response of the material to fast neutron and thermal neutron irradiation; and
a processor and logic integrated with and/or executable by the processor, the logic being configured to perform a discrimination method for processing an output of the photodetector using pulse shape discrimination for differentiating responses of the material to fast neutron and thermal neutron irradiation.

16. A method for fabricating a scintillator material, the method comprising:
heating a precursor mixture up to at least a temperature of about 80 degrees Celsius until a polymerization process is complete;
wherein the precursor mixture comprises:
a polymer matrix precursor present in an amount ranging from about 60 wt. % to about 95 wt. %;
a primary fluor present in an amount ranging from about 5 wt. % to about 40 wt. %, wherein the primary fluor is soluble in the polymer matrix precursor;
a secondary fluor present in an amount ranging from about 0.2 wt. % to about 6 wt. %;
an initiator;
a Li-containing compound, wherein the Li-containing compound is a salt of an aliphatic acid having no more than 6 carbons per molecule thereof; and
a coordinating solvent.

17. The method as recited in claim 16, wherein the Li-containing compound is soluble in the coordinating solvent.

18. The method as recited in claim 16, wherein the coordinating solvent is a polar solvent.

19. The method as recited in claim 16, wherein the coordinating solvent is selected from the group consisting of: butyric acid, propanoic acid, and methacrylic acid.

20. The method as recited in claim 16, an amount of initiator is in a range of about 0.001 wt. % to about 1.0 wt. % in the precursor mixture.

\* \* \* \* \*